US012225395B2

(12) United States Patent
Cao et al.

(10) Patent No.: US 12,225,395 B2
(45) Date of Patent: Feb. 11, 2025

(54) CARRIER AGGREGATION UPLINK SWITCH GAP DETECTION AND REPORT

(71) Applicant: Qualcomm Incorporated, San Diego, CA (US)

(72) Inventors: Yiqing Cao, Beijing (CN); Peter Gaal, San Diego, CA (US); Chenxi Hao, Beijing (CN); Bo Chen, Beijing (CN)

(73) Assignee: QUALCOMM Incorporated, San Diego, CA (US)

(*) Notice: Subject to any disclaimer, the term of this patent is extended or adjusted under 35 U.S.C. 154(b) by 351 days.

(21) Appl. No.: 17/780,175

(22) PCT Filed: Nov. 29, 2019

(86) PCT No.: PCT/CN2019/121893
§ 371 (c)(1),
(2) Date: May 26, 2022

(87) PCT Pub. No.: WO2021/102887
PCT Pub. Date: Jun. 3, 2021

(65) Prior Publication Data
US 2023/0009220 A1  Jan. 12, 2023

(51) Int. Cl.
*H04W 4/00* (2018.01)
*H04W 24/08* (2009.01)
(Continued)

(52) U.S. Cl.
CPC ....... *H04W 24/08* (2013.01); *H04W 72/1268* (2013.01); *H04W 72/23* (2023.01); *H04W 74/0841* (2013.01)

(58) Field of Classification Search
None
See application file for complete search history.

(56) References Cited

U.S. PATENT DOCUMENTS 10,448,421 B2    10/2019  Bhattad et al.
2015/0181589 A1   6/2015  Luo et al.
(Continued)

FOREIGN PATENT DOCUMENTS

CA    3032500 A1    3/2018
CN    105830379 A   8/2016
(Continued)

OTHER PUBLICATIONS

Huawei: "Feasible Scenario of SRS Transmission on the TDD Scells", 3GPP RAN WG4 Meeting #76bis, R4-155504, Sophia Antipolis, France, Oct. 12-16, 2015, Oct. 16, 2015 (Oct. 16, 2015), 3 pages, the whole document.
(Continued)

*Primary Examiner* — Zewdu A Beyen
(74) *Attorney, Agent, or Firm* — Holland & Hart LLP/Qualcomm

(57) ABSTRACT

Methods, systems, and devices for wireless communications are described. A user equipment (UE) may receive, from a base station, an indication of a monitoring window used by the base station to monitor for uplink transmissions from the UE. The UE may receive a control signal scheduling uplink resources for an uplink transmission by the UE on at least a first component carrier, the first component carrier in a first radio frequency spectrum band. The UE may reconfigure, in response to the received control signal, a first transmit chain of the UE from a second component carrier in a second radio frequency spectrum band to the first component carrier in the first radio frequency spectrum band for the uplink transmission. The UE may transmit, based at least in part on the indicated monitoring window and using at least the reconfigured first transmit chain, the uplink transmission on the first component carrier using the scheduled uplink resources.

35 Claims, 17 Drawing Sheets

(51) Int. Cl.
*H04W 72/1268* (2023.01)
*H04W 72/23* (2023.01)
*H04W 74/0833* (2024.01)

(56) References Cited

U.S. PATENT DOCUMENTS

| | | | |
|---|---|---|---|
| 2017/0302419 A1 | 10/2017 | Liu et al. | |
| 2019/0165971 A1 | 5/2019 | Manolakos et al. | |
| 2019/0281588 A1* | 9/2019 | Zhang | H04B 7/0617 |
| 2020/0267667 A1* | 8/2020 | MolavianJazi | H04W 52/365 |

FOREIGN PATENT DOCUMENTS

| | | |
|---|---|---|
| CN | 109417454 A | 3/2019 |
| WO | WO-2015094816 | 6/2015 |
| WO | WO-2017173388 A1 | 10/2017 |
| WO | WO-2018175051 | 9/2018 |
| WO | WO-2019050640 A1 | 3/2019 |

OTHER PUBLICATIONS

International Search Report and Written Opinion—PCT/CN2019/121893—ISA/EPO—Aug. 28, 2020.
Panasonic: "Discussion on UCI Multiplexing", 3GPP TSG RAN WG1 Meeting #91, R1-1720450, 3rd Generation Partnership Project (3GPP), Mobile Competence Centre, 650, Route Des Lucioles, F-06921 Sophia-Antipolis Cedex, France, vol. RAN WG1, USA, Nov. 27, 2017-Dec. 1, 2017 Nov. 17, 2017, XP051368990, pp. 1-5, section 1 and 2.
Samsung: "RAN1 Impact on Switching Period Between 1Tx and 2Tx for Two Uplink Carriers" 3GPP TSG RAN WG1 #99, R1-1912439, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18-22, 2019, XP051820029, Nov. 8, 2019, 5 pages, sections 1-3, sections 1 and 2, figures 1,2.
Supplementary European Search Report—EP19954160—Search Authority—The Hague—Jun. 29, 2023.

* cited by examiner

CARRIER AGGREGATION UPLINK SWITCH GAP DETECTION AND REPORT

CROSS REFERENCE

The present application is a 371 national stage filing of International PCT Application No. PCT/CN2019/121893 by Cao et al., entitled "CARRIER AGGREGATION UPLINK SWITCH GAP DETECTION AND REPORT," filed Nov. 29, 2019, which is assigned to the assignee hereof, and which is expressly incorporated by reference in its entirety herein.

BACKGROUND

The following relates generally to wireless communications, and more specifically to carrier aggregation uplink switch gap detection and report.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support carrier aggregation uplink switch gap detection and report. Generally, the described techniques provide various mechanisms that support wireless communications in a wireless network. Broadly, aspects of the described techniques implement uplink transmissions in a user equipment (UE), and switching a transmit chain between different component carriers, for example in different radio frequency spectrum bands. In some examples, the techniques may support uplink multiple-input/multiple-output (UL MIMO) in a UE configured with two or more transmit chains. For example, the UE may have a first transmit chain that is a multi-band transmit chain, e.g., configured to operate in more than one radio frequency spectrum band. In some examples, the UE may have a second transmit chain that is at least configured to operate in one or more radio frequency spectrum bands. The UE may signal its switching time (e.g., the time it takes to retune or otherwise reconfigure the first transmit chain from one radio frequency spectrum band to another) in a UE capability message, for example. The base station may, based on the UE capability, select a monitoring window (e.g., a duration of a monitoring time) that the base station will use to monitor for uplink transmissions from the UE. Accordingly, the base station may transmit a control signal (e.g., a downlink control information (DCI) grant) to the UE scheduling an uplink transmission in at least one component carrier. Based on the grant, the UE may reconfigure the first transmit a chain from a second radio frequency spectrum band to the first radio frequency spectrum band for the uplink transmission. The UE may, after reconfiguring the first transmit chain, perform the uplink transmission using the preconfigured first transmit chain.

In some case, the UE may also use the second transmit chain for the uplink transmission (e.g., for an uplink multi-carrier or UL-MIMO transmission). For example, the UE may use the reconfigured first transmit chain to transmit an uplink signal on a first component carrier and the second transmit chain to transmit an uplink signal on a second component carrier of the first radio frequency spectrum band. In another example, the UE may use the reconfigured first transmit chain to transmit a first portion of the uplink signal initially, and then use the reconfigured first transmit chain (and/or the second transmit chain) to transmit a second portion of the uplink signal in the first radio frequency spectrum band.

The base station may select the duration of the monitoring window to include at least the beginning symbol/slot in which the uplink transmission is scheduled to be performed. Accordingly, the base station may receive the uplink transmission from the UE during the signaled monitoring window.

A method of wireless communication at a UE is described. The method may include receiving, from a base station, an indication of a monitoring window used by the base station to monitor for uplink transmissions from the UE, receiving a control signal scheduling uplink resources for an uplink transmission by the UE on at least a first component carrier, the first component carrier in a first radio frequency spectrum band, reconfiguring, in response to the received control signal, a first transmit chain of the UE from a second component carrier in a second radio frequency spectrum band to the first component carrier in the first radio frequency spectrum band for the uplink transmission, and transmitting, based on the indicated monitoring window and using at least the reconfigured first transmit chain, the uplink transmission on the first component carrier using the scheduled uplink resources.

An apparatus for wireless communication at a UE is described. The apparatus may include a processor, memory coupled with the processor, and instructions stored in the memory. The instructions may be executable by the processor to cause the apparatus to receive, from a base station, an indication of a monitoring window used by the base station to monitor for uplink transmissions from the UE, receive a control signal scheduling uplink resources for an uplink transmission by the UE on at least a first component carrier, the first component carrier in a first radio frequency spectrum band, reconfigure, in response to the received control signal, a first transmit chain of the UE from a second component carrier in a second radio frequency spectrum band to the first component carrier in the first radio frequency spectrum band for the uplink transmission, and transmit, based on the indicated monitoring window and using at least the reconfigured first transmit chain, the uplink transmission on the first component carrier using the scheduled uplink resources.

Another apparatus for wireless communication at a UE is described. The apparatus may include means for receiving, from a base station, an indication of a monitoring window used by the base station to monitor for uplink transmissions from the UE, receiving a control signal scheduling uplink resources for an uplink transmission by the UE on at least a first component carrier, the first component carrier in a first radio frequency spectrum band, reconfiguring, in response to the received control signal, a first transmit chain of the UE from a second component carrier in a second radio frequency spectrum band to the first component carrier in the first radio frequency spectrum band for the uplink transmission, and transmitting, based on the indicated monitoring window and using at least the reconfigured first transmit chain, the uplink transmission on the first component carrier using the scheduled uplink resources.

A non-transitory computer-readable medium storing code for wireless communication at a UE is described. The code may include instructions executable by a processor to receive, from a base station, an indication of a monitoring window used by the base station to monitor for uplink transmissions from the UE, receive a control signal scheduling uplink resources for an uplink transmission by the UE on at least a first component carrier, the first component carrier in a first radio frequency spectrum band, reconfigure, in response to the received control signal, a first transmit chain of the UE from a second component carrier in a second radio frequency spectrum band to the first component carrier in the first radio frequency spectrum band for the uplink transmission, and transmit, based on the indicated monitoring window and using at least the reconfigured first transmit chain, the uplink transmission on the first component carrier using the scheduled uplink resources.

Some examples of the method, apparatuses, and non-transitory computer-readable medium described herein may further include operations, features, means, or instructions for identifying a timing for the multi-carrier transmission based on a timing offset indicated by the received control signal, determining, based on the identified timing, that the first transmit chain can be reconfigured before expiration of the indicated monitoring window, and reconfiguring the first transmit chain based on the determining.

Some examples of the method, apparatuses, and non-transitory computer-readable medium described herein may further include operations, features, means, or instructions for transmitting a UE capability message indicating a reconfiguration time for the first transmit chain, where a duration of the monitoring window may be based on the UE capability message.

In some examples of the method, apparatuses, and non-transitory computer-readable medium described herein, the duration of the monitoring window may be cell-specific and based on a largest switching gap reported by at least one UE to the base station.

In some examples of the method, apparatuses, and non-transitory computer-readable medium described herein, the duration of the monitoring window may be UE-specific for the UE based at least in part the UE capability message.

Some examples of the method, apparatuses, and non-transitory computer-readable medium described herein may further include operations, features, means, or instructions for transmitting, in the multi-carrier transmission, an indication that the UE may have reconfigured the first transmit chain of the UE.

In some examples of the method, apparatuses, and non-transitory computer-readable medium described herein, the indication includes one or more bits via a resource determined using a resource allocation mechanism which may be decided by a value in a beta-offset table.

In some examples of the method, apparatuses, and non-transitory computer-readable medium described herein, the value in the beta-offset table includes one or more entries of a HARQ table, or one or more entries of a CSI table, or a combination thereof.

In some examples of the method, apparatuses, and non-transitory computer-readable medium described herein, the beta-offset table may be for the indication of monitoring windows used by the base station.

In some examples of the method, apparatuses, and non-transitory computer-readable medium described herein, the monitoring window spans one or more slots, with a first slot of the one or more slots including a slot in which the multi-carrier transmission may be scheduled.

In some examples of the method, apparatuses, and non-transitory computer-readable medium described herein, the multi-carrier transmission includes an uplink data signal transmission, or an uplink control signal transmission, or a reference signal transmission, a physical random access channel (PRACH), or a combination thereof.

In some examples of the method, apparatuses, and non-transitory computer-readable medium described herein, the control signal includes a RRC grant, or a DCI grant, or a combination thereof.

In some examples of the method, apparatuses, and non-transitory computer-readable medium described herein, the indication of the monitoring window may be received in a RRC configuration signal, or RRC reconfiguration signal, or a system information signal, or a combination thereof.

A method of wireless communication at a base station is described. The method may include determining, based on a capability of the UE, a monitoring window to use to monitor for uplink transmissions from a UE, transmitting, to the UE, an indication of the monitoring window, transmitting, to the UE, a control signal scheduling uplink resources for an uplink transmission by the UE on at least a first component carrier, the first component carrier in a first radio frequency spectrum band, and receiving, based on the monitoring window, the uplink transmission on the first component carrier using the scheduled uplink resources.

An apparatus for wireless communication at a base station is described. The apparatus may include a processor, memory coupled with the processor, and instructions stored in the memory. The instructions may be executable by the processor to cause the apparatus to determine, based on a capability of the UE, a monitoring window to use to monitor for uplink transmissions from a UE, transmit, to the UE, an indication of the monitoring window, transmit, to the UE, a control signal scheduling uplink resources for an uplink transmission by the UE on at least a first component carrier, the first component carrier in a first radio frequency spectrum band, and receive, based on the monitoring window, the uplink transmission on the first component carrier using the scheduled uplink resources.

Another apparatus for wireless communication at a base station is described. The apparatus may include means for determining, based on a capability of the UE, a monitoring window to use to monitor for uplink transmissions from a UE, transmitting, to the UE, an indication of the monitoring window, transmitting, to the UE, a control signal scheduling uplink resources for an uplink transmission by the UE on at least a first component carrier, the first component carrier in a first radio frequency spectrum band, and receiving, based on the monitoring window, the uplink transmission on the first component carrier using the scheduled uplink resources.

A non-transitory computer-readable medium storing code for wireless communication at a base station is described. The code may include instructions executable by a processor to determine, based on a capability of the UE, a monitoring window to use to monitor for uplink transmissions from a UE, transmit, to the UE, an indication of the monitoring window, transmit, to the UE, a control signal scheduling uplink resources for an uplink transmission by the UE on at least a first component carrier, the first component carrier in a first radio frequency spectrum band, and receive, based on the monitoring window, the uplink transmission on the first component carrier using the scheduled uplink resources.

Some examples of the method, apparatuses, and non-transitory computer-readable medium described herein may further include operations, features, means, or instructions for receiving a UE capability message indicating a reconfiguration time for the first transmit chain of the UE, where a duration of the monitoring window may be based on the UE capability message.

In some examples of the method, apparatuses, and non-transitory computer-readable medium described herein, the duration of the monitoring window may be cell-specific and based on a largest switching gap reported by at least one UE to the base station.

In some examples of the method, apparatuses, and non-transitory computer-readable medium described herein, the duration of the monitoring window may be UE-specific for the UE based at least in part the UE capability message.

Some examples of the method, apparatuses, and non-transitory computer-readable medium described herein may further include operations, features, means, or instructions for receiving, in the multi-carrier transmission, an indication that the UE reconfigured the first transmit chain of the UE.

In some examples of the method, apparatuses, and non-transitory computer-readable medium described herein, the indication includes one or more bits via a resource determined using a resource allocation mechanism which may be decided by a value in a beta-offset table.

In some examples of the method, apparatuses, and non-transitory computer-readable medium described herein, the value in the beta-offset table includes one or more entries of a HARQ table, or one or more entries of a CSI table, or a combination thereof.

In some examples of the method, apparatuses, and non-transitory computer-readable medium described herein, the beta-offset table may be for the indication of monitoring windows used by the base station.

In some examples of the method, apparatuses, and non-transitory computer-readable medium described herein, the monitoring window spans one or more slots, with a first slot of the one or more slots including a slot in which the multi-carrier transmission may be scheduled.

In some examples of the method, apparatuses, and non-transitory computer-readable medium described herein, the multi-carrier transmission includes an uplink data signal transmission, or an uplink control signal transmission, or a reference signal transmission, or a physical random access channel (PRACH) transmission, or a combination thereof.

In some examples of the method, apparatuses, and non-transitory computer-readable medium described herein, the control signal includes a RRC grant, or a DCI grant, or a combination thereof.

In some examples of the method, apparatuses, and non-transitory computer-readable medium described herein, the indication of the monitoring window may be transmitted in a RRC configuration signal, or a RRC reconfiguration signal, or a system information signal, or a combination thereof.

DETAILED DESCRIPTION

Figure 1:
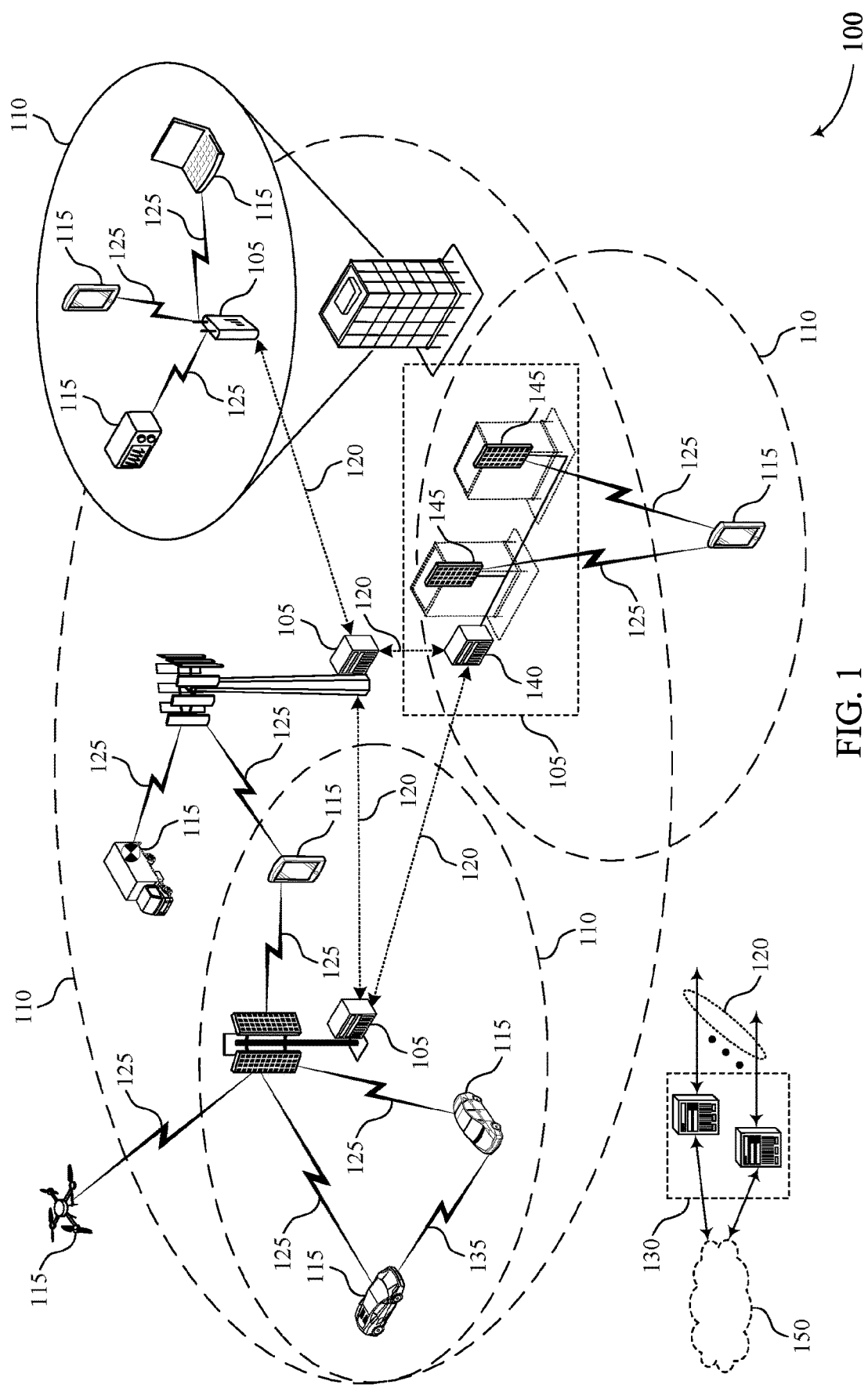
FIG. 1 illustrates an example of a system for wireless communications that supports carrier aggregation uplink switch gap detection and report in accordance with aspects of the present disclosure.

A user equipment (UE) may be limited to a certain number (e.g., two) transmit chains, e.g., due to complexity, thermal and/or power consumption limitations. For inter-band carrier aggregation communications, the UE may typically utilize one transmit chain for transmissions in a first radio frequency spectrum band and the other transmit chain for transmissions and a second radio frequency spectrum band. To support uplink multiple-input/multiple-output (UL MIMO), or any other multi-carrier uplink transmissions, the UE may need to switch (e.g., reconfigure, retune, etc.) at least one of the transmit chains between different radio frequency spectrum bands. Scheduling such multi-carrier uplink transmissions may be problematic from the perspective of base station. For example, the base station may not know the current transmit port status of the UE, e.g., the base station may not know which radio frequency spectrum band the first transmit chain is tuned to, and consequently may not know whether the UE would need to reconfigure its transmit chain if scheduled for a uplink transmission.

Aspects of the disclosure are initially described in the context of a wireless communications system. Generally, the described techniques provide various mechanisms that support wireless communications in a wireless network. Broadly, aspects of the described techniques implement uplink multiple-input/multiple-output (UL MIMO) in a UE configured with two or more transmit chains. For example, the UE may have a first transmit chain that is a multi-band transmit chain, e.g., configured to operate in more than one radio frequency spectrum band. The UE may have a second transmit chain that is at least configured to operate in one or more radio frequency spectrum bands. The UE may signal its switching time (e.g., the time it takes to retune or otherwise reconfigure the first transmit chain from one radio frequency spectrum band to another) in a UE capability message, for example. The base station may, based on the UE capability, select a monitoring window that the base station will use to monitor for uplink transmissions from the UE. Accordingly, the base station may transmit a control signal (e.g., a downlink control information (DCI) grant and/or radio resource control (RRC) grant) to the UE scheduling an uplink transmission in the first radio frequency spectrum band. Based on the grant, the UE may reconfigure the first transmit chain from a second radio frequency spectrum band to the first radio frequency spectrum band for the uplink transmission. The UE may, after reconfiguring the first transmit chain, perform the uplink transmission using the preconfigured first transmit chain and the second transmit chain. The base station may select the duration of the monitoring window to include at least the beginning symbol/slot in which the uplink transmission is scheduled to be performed. Accordingly, the base station may receive the uplink transmission from the UE during the signaled monitoring window.

Aspects of the disclosure are further illustrated by and described with reference to apparatus diagrams, system diagrams, and flowcharts that relate to carrier aggregation uplink switch gap detection and report.

FIG. 1 illustrates an example of a wireless communications system 100 that supports early indication of new radio-light dedicated system information in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive, from a base station 105, an indication of a monitoring window used by the base station to monitor for uplink transmissions from the UE 115. The UE 115 may receive a control signal scheduling uplink resources for an uplink transmission by the UE 115 on at least a first component carrier, the first component carrier in the first radio frequency spectrum band. The UE 115 may reconfigure, in response to the received control signal, a first transmit chain of the UE 115 from a second component carrier in the second radio frequency spectrum band to the first component carrier in the first radio frequency spectrum band for the uplink transmission. The UE 115 may transmit, based at least in part on the indicated monitoring window and using at least the reconfigured first transmit chain, the uplink transmission on the first component carrier using the scheduled uplink resources.

A base station 105 may determine, based at least in part on a capability of the UE 115, a monitoring window to use to monitor for uplink transmissions from a UE 115. The bass station 105 may transmit, to the UE 115, an indication of the monitoring window. The base station 105 may transmit, to the UE 115, a control signal scheduling uplink resources for an uplink transmission by the UE 115 on at least a first component carrier, the first component carrier in a first radio frequency spectrum band. The base station 105 may receive, based at least in part on the monitoring window, the uplink transmission on the first component carrier using the scheduled uplink resources.

Figure 2:
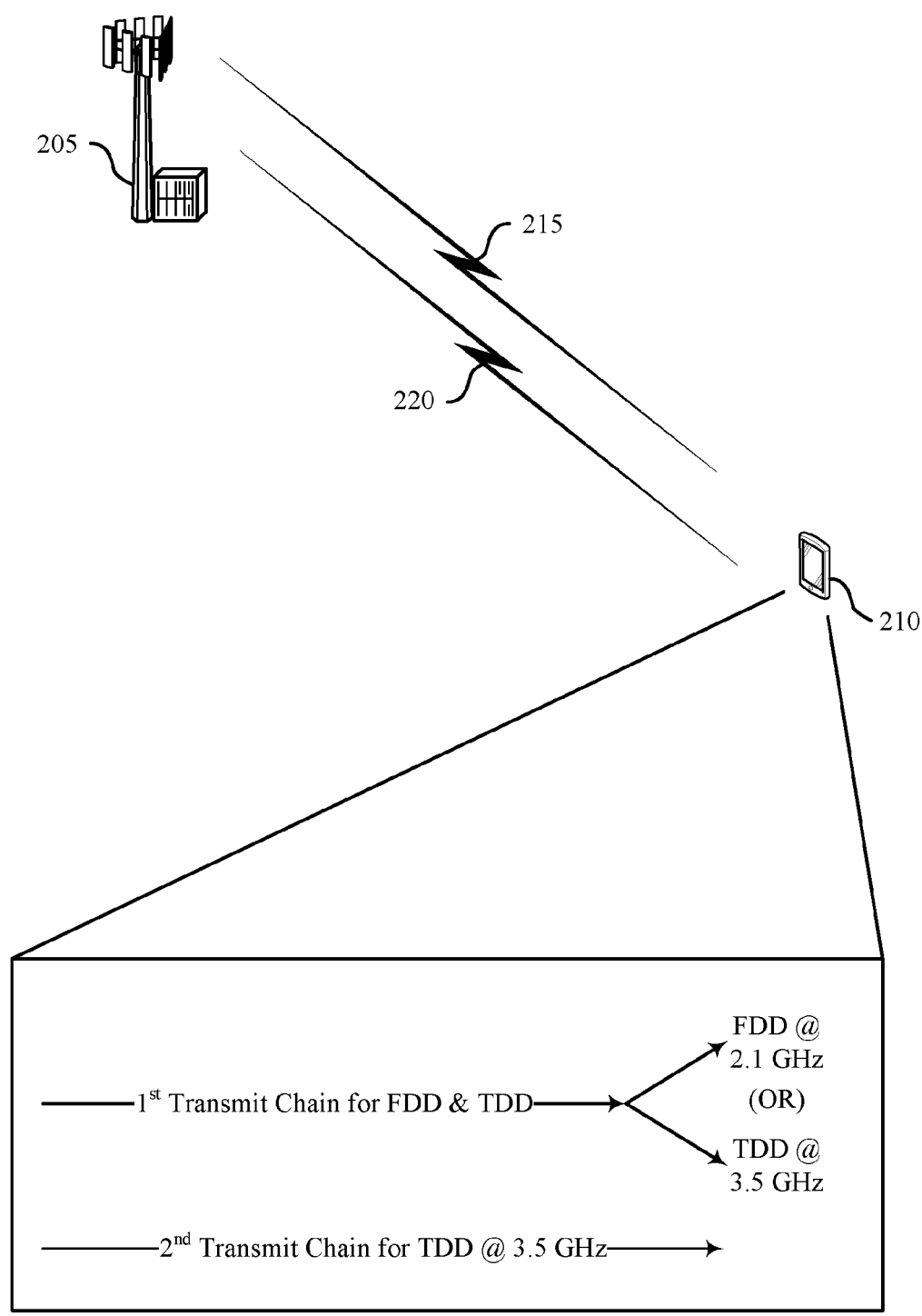
FIG. 2 illustrates an example of a wireless communication system that supports carrier aggregation uplink switch gap detection and report in accordance with aspects of the present disclosure.

FIG. 2 illustrates an example of a wireless communication system 200 that supports carrier aggregation uplink switch gap detection and report in accordance with aspects of the present disclosure. In some examples, wireless communication system 200 may implement aspects of wireless communication system 100. Wireless communication system 200 may include base station 205, and UE 210, which may be examples of the corresponding devices described herein.

In some configurations, a UE may be limited to two transmit chains, e.g., due to thermal and/or power consumption limitations. For inter-band CA communications, the UE may typically utilize one transmit chain for transmissions in a first radio frequency spectrum band and the other transmit chain for transmissions in a second radio frequency spectrum band. To support uplink multiple-input/multiple-output (UL MIMO), or any other multi-carrier uplink transmission, the UE may switch (e.g., reconfigure, retune, etc.) at least one of the transmit chains between different radio frequency spectrum bands. Scheduling such multi-carrier uplink transmissions may be problematic from the perspective of base station. For example, the base station may not know the current transmit port status of the UE, e.g., the base station may not know which radio frequency spectrum band the first transmit chain is tuned to, and consequently may not know whether the UE would need to reconfigure its transmit chain if scheduled for an uplink transmission.

For example, UE 210 may be configured with a first transmit chain that supports communications on multiple radio frequency spectrum bands and a second transmit chain that supports communications on at least one radio frequency spectrum band. In the non-limiting example illustrated in wireless communication system 200, the first transmit chain may support communications on a 2.1 GHz (e.g., a second radio frequency spectrum band 220) and a 3.5 GHz radio frequency spectrum band (e.g., a first radio frequency spectrum band 215) and the second transmit chain may support communications on the 3.5 GHz radio frequency spectrum band (e.g., the first radio frequency spectrum band 215). Accordingly, UE 210 may be configured to support FDD and TDD operations based on the first and second transmit chains and support TDD operations based on the second transmit chain.

As discussed, scheduling UE 210 for an uplink transmission (e.g., such as UL MIMO) may be problematic from the perspective of base station 205. That is, UE 210 may determine its switching position (e.g., when to reconfigure the first transmit chain) based on a grant (e.g., such as a DCI grant, RRC grant, etc.) scheduling the uplink transmission. However, base station 205 may not know the current transmit port status of the first transmit chain of UE 210 (e.g., base station 205 may not know whether the first transmit chain of UE 210 is configured to communicate in the first radio frequency spectrum band 215 or the second radio frequency spectrum band 220). This may be problematic when scheduling the uplink transmission because the switching time (e.g., the time it takes UE 210 to retune or otherwise reconfigure the first transmit chain to the first radio frequency spectrum band 215) for UE 210 may be extensive. That is, retuning or otherwise reconfiguring a transmit chain from one component carrier to a different component carrier within the same radio frequency spectrum band may be relatively quick (e.g., approximately one OFDM symbol, or less). However, retuning or otherwise reconfiguring a transmit chain from one radio frequency spectrum band to another may take much longer (e.g., multiple OFDM symbols, depending upon the capabilities of UE 210).

When scheduling an uplink transmission for UE 210, base station 205 typically transmits a DCI or RRC grant (e.g., a control signal) to UE 210 scheduling uplink resources for the uplink transmission. The grant may generally carry or otherwise convey an indication of a timing offset (e.g., a K2 value) scheduling the uplink transmission. That is, the timing offset (e.g., the K2 value) may generally signal the timing difference between the grant and the scheduled beginning of the uplink transmission. When selecting the timing offset for the uplink transmission, there are two options. In one option, the timing offset is greater than the reconfiguration time of UE 210 (e.g., K2>threshold). In this option, the grant scheduling the uplink transmission arrives early enough that UE 210 has sufficient time to reconfigure the first transmit chain to begin the uplink transmission at the scheduled beginning time. In another option, the timing offset is shorter than the reconfiguration time of UE 210 (e.g., K2≤threshold). In this option, UE 210 needs additional time to prepare the uplink transmission (e.g., to reconfigure the first transmit chain, prepare the uplink information for transmission, etc.), and therefore cannot begin the uplink transmission when it is scheduled to begin. In some wireless communication systems, this may result in base station 205 not being able to receive the uplink transmission from UE 210, e.g., due to the timing mismatch between the reconfiguration time of UE 210 and the scheduled start of the uplink transmission. However, aspects of the described techniques support mechanisms that improve performance of the uplink transmission by UE 210 in the situation where base station 205 may not know the transmit port status of the first transmit chain of UE 210.

Accordingly, aspects of the described techniques support UE 210 indicating to base station 205 (e.g., in a UE capability message) its switching time (e.g., the time that it takes for UE 210 to retune or otherwise reconfigure its first transmit chain from one radio frequency spectrum band to another). However, in some situations, such as after a cell reselection procedure, the base station 205 may implement aspects of the described techniques without receiving the UE capability message.

Additionally or alternatively, aspects of the described techniques support base station 205 scheduling the uplink transmission from UE 210, and identifying a monitoring window in which to attempt to blindly detect the uplink transmission. In some aspects, the duration of the monitoring window may be cell-specific (e.g., based on the largest switching gap reported by at least one UE to base station 205). In some aspects, the duration of the monitoring window may be UE-specific (e.g., based on the UE capability message).

That is, base station 205 may optionally receive a UE capability message that carries or otherwise conveys information indicating the reconfiguration time for the first transmit chain of UE 210. The UE capability message may be received during initial connection establishment and/or configuration/reconfiguration procedures. For example, the UE capability message may be received over a random access channel (RACH) message, an RRC message, and the like. The UE capability message may include one or more bits, fields, parameters, etc., that explicitly and/or implicitly indicate the reconfiguration time for the first transmit chain of UE 210 (as well as any other multi-band transmit chain(s) of UE 210).

Base station 205 may select the duration or length of the monitoring window to use to monitor for the uplink transmissions from UE 210 (e.g., such as an uplink transmission) based on the UE capability of UE 210, if known. That is, base station 205 may use the reconfiguration time indicated in the UE capability message to select or otherwise identify the duration of the monitoring window. The monitoring window duration may be set to be the largest uplink switching time (N2) plus the round-trip-time (RTT) plus a delta (e.g., a margin of error). In some aspects, the duration of the monitoring window may be cell-specific (e.g., based on the largest switching gap reported by at least one UE to base station 205). In some aspects, the duration of the monitoring window may be UE-specific (e.g., based on the UE capability message).

In some examples, base station 205 may transmit or otherwise convey an indication of the monitoring window (e.g., the duration of the monitoring window) to UE 210. Base station 205 may convey the indication of the monitoring window in a cell information or cell reconfiguration information message (e.g., such as an RRC message, an SSB, etc.). Accordingly, the monitoring window duration may be informed by base station 205 in its serving cell information, or cell reconfiguration information, and the like, e.g., during cell configuration.

Base station 205 may determine that UE 210 is to perform an uplink transmission using one or more component carriers in the first radio frequency spectrum band 215. For example, base station 205 may receive a scheduling request, a buffer/uplink status report, or any other request for uplink resources/indication that UE 210 has uplink signals to transmit. Accordingly, base station 205 may transmit or otherwise convey a control signal to UE 210 scheduling uplink resources for the uplink transmission. For example, base station 205 may transmit a DCI and/or RRC grant (e.g. the control signal) to UE 210 scheduling the resources for the uplink transmission. In some aspects, the uplink transmission may be scheduled for at least a first component carrier (e.g., in a TDD configuration) of the first radio frequency spectrum band. In some aspects, the uplink transmission may be scheduled for the first component carrier and a second component carrier of the first radio frequency spectrum band 215 (e.g., in a FDD configuration).

As discussed, the grant may identify various uplink resources scheduled for the uplink transmission and, in some examples, indicate the timing offset of the uplink transmission. For example, the timing offset may be a relative timing indication between the grant and the start of the uplink transmission. In some examples, the grant may also be configured to convey an indication of the monitoring window that base station 205 will use for the corresponding uplink transmission.

UE 210 may receive the control signal (e.g., the grant) scheduling the uplink transmission on at least the first component carrier. UE 210 may identify or otherwise determine when the uplink transmission is scheduled (e.g., which slot/symbol) based on the timing offset indicated in the grant. However, the first transmit chain of UE 210 may be configured to communicate on a component carrier of the second radio frequency spectrum band 220. As the uplink transmission is scheduled on the first radio frequency spectrum band 215, UE 210 may reconfigure the first transmit chain from the second radio frequency spectrum band 220 to the first radio frequency spectrum band 215 for the uplink transmission. That is, UE 210 may retune or otherwise reconfigure various components within the modem, baseband circuitry, intermediate frequency (IF) circuitry, radio frequency front-end (RF-FE), and the like, to reconfigure the first transmit chain from the second radio frequency spectrum band 220 to the first radio frequency spectrum band 215.

As discussed, there may be two scenarios at this stage. In a first ideal scenario, the first transmit chain of UE 210 may be reconfigured prior to expiration of the monitoring window. In this scenario, UE 210 may reconfigure the first transmit chain and transmit the uplink transmission (e.g., when the uplink signal is ready for transmission) using the first transmit chain (as reconfigured), e.g., in a TDD configuration. In some examples, UE 210 may use the second transmit chain when performing the uplink transmission over the resources identified in the grant.

In the situation where UE 210 determines that the first transmit chain will be reconfigured after expiration of the monitoring window, UE 210 may recognize the scenario as a mismatch and do nothing (e.g., refrain from performing the uplink transmission) or UE 210 may transmit a UE capability message indicating the reconfiguration time for the first transmit chain. That is, UE 210 may update its UE capability information with base station 205 to more accurately reflect the reconfiguration time of the first transmit chain of UE 210.

Accordingly and in the scenario where UE 210 has time to reconfigure the first transmit chain, UE 210 may begin the uplink transmission after the first transmit chain is reconfigured to the first radio frequency spectrum band 215 and the uplink signal is ready for transmission. Base station 205 may monitor at least the first component carrier (in a TDD scenario) and the second component carrier too (in an FDD scenario) of the first radio frequency spectrum band 215 to detect the uplink transmission for the duration of the monitoring window. As discussed, the monitoring window may be configured to at least extend or cover the scheduled time for the uplink transmission. In some aspects, the monitoring window may be configured such that it begins just prior to (e.g., a few symbols/slots before) the beginning of the uplink transmission and ends at the end or after the uplink transmission is scheduled to be completed. In some aspects, the monitoring window may extend for one or more slots, with at least a first slot in the one or more slots including the slot in which the uplink transmission is scheduled. Base station 205 may therefore, during the duration of the monitoring window, attempt to blindly detect the uplink transmission from UE 210. Accordingly, base station 205 may receive the uplink transmission on at least the first component carrier of the first radio frequency spectrum band 215 and using the resources scheduled in the grant.

In some aspects, UE 210 may configure one or more bits, fields, parameters, etc., in the uplink transmission to convey an indication that UE 210 has reconfigured the first transmit chain from the second radio frequency spectrum band 220 to the first radio frequency spectrum band 215. UE 210 may signal this information to confirm to base station 205 that it has reconfigured the first transmit chain. In one example, the indication that UE 210 has reconfigured the first transmit chain may one or more bits via a resource determined using a resource allocation mechanism that is decided by a value in a beta-offset table. For example, the value in the beta-offset table may include one or more entries of a HARQ table and/or a CSI table. As another example, the beta-offset table may be associated with the indication of monitoring windows supported by base station 205 (e.g., a new beta-offset table).

However, in some scenarios base station 205 may not detect the uplink transmission during the monitoring window. In this situation, base station 205 may transmit a second grant (e.g., second control signal) rescheduling the uplink transmission and reset the monitoring window. For example, base station 205 may extend the duration of the monitoring window to improve the chances of detecting the next scheduled uplink transmission.

Although the techniques described above are typically discussed in terms of uplink data being transmitted in the uplink transmission, it is to be understood that these techniques may be applicable for an uplink transmission of reference signals, feedback reports, synchronization signals, or any other uplink signal being transmitted by UE 210. For example, the described techniques may be implemented for uplink transmission of an aperiodic sounding reference signal (A-SRS), an aperiodic channel state information reference signal (CSI-RS), a physical random access channel (PRACH) transmission, uplink control information, and the like.

Figure 3:
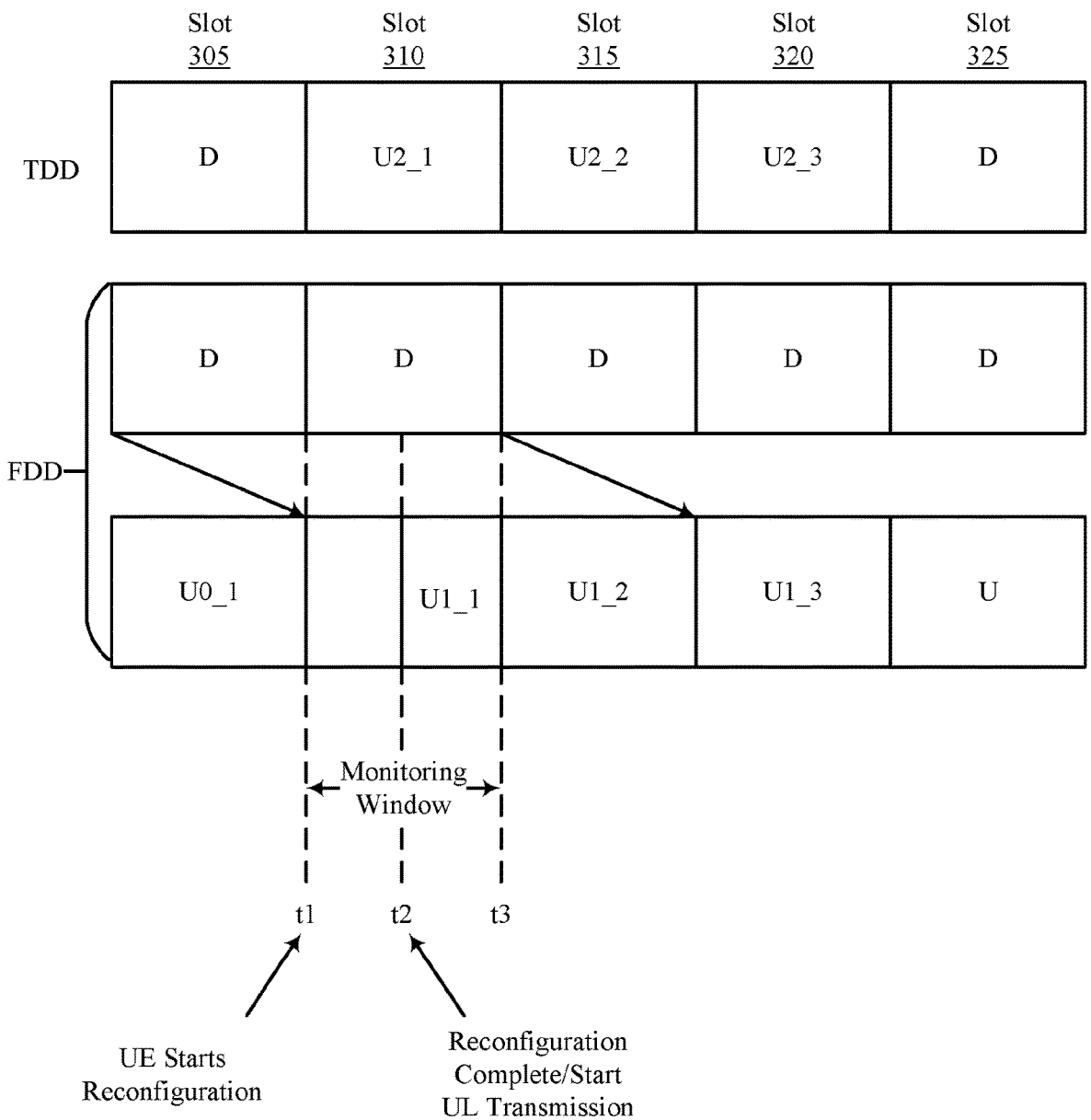
FIG. 3 illustrates an example of a timing diagram that supports carrier aggregation uplink switch gap detection and report in accordance with aspects of the present disclosure.

FIG. 3 illustrates an example of a timing diagram 300 that supports carrier aggregation uplink switch gap detection and report in accordance with aspects of the present disclosure. In some examples, timing diagram 300 may implement aspects of wireless communication systems 100 and/or 200. Aspects of timing diagram 300 may be implemented by a base station and/or UE, which may be examples of the corresponding devices described herein.

As discussed above, aspects of the described techniques support the base station configuring a monitoring window in which to blindly detect an uplink transmission from the UE in a first radio frequency spectrum band. The monitoring window (e.g., a duration of the monitoring window, a starting time for the monitoring window, an ending time for the monitoring window, and the like) may be selected based on the capability of the UE with regards to retuning or otherwise reconfiguring a first transmit chain from a second radio frequency spectrum band to a first radio frequency spectrum band for the uplink transmission, if known by the base station. For example, during initial connection establishment (or afterwards) the UE may transmit an indication of its capabilities in a UE capability message to the base station. The UE capability message may convey an indication of, among other things, the reconfiguration time for the first transmit chain of the UE and, if applicable, the reconfiguration time for any multi-band transmit chain(s) of the UE.

Accordingly, the base station may select a monitoring window duration based on the reconfiguration time for the first transmit chain of the UE in addition to the scheduled uplink transmission from the UE. The duration of the monitoring window may also be based on other consideration, such as the RTT between the base station and UE, a delta value providing a margin of error, and the like. In some aspects, the base station may provide an indication of the monitoring window to monitor for the uplink transmissions from the UE in an RRC message, the DCI grant scheduling the uplink transmission, and the like. In some aspects, the duration of the monitoring window may be cell-specific (e.g., based on the largest switching gap reported by at least one UE to base station). In some aspects, the duration of the monitoring window may be UE-specific (e.g., based on the UE capability message).

The base station may then transmit or otherwise convey the control signal (e.g., a DCI and/or RRC grant) scheduling uplink resources for an uplink transmission from the UE. The uplink transmission may be performed on at least a first component carrier (e.g., in a TDD scenario) and the first component carrier and a second component carrier (e.g., in a FDD scenario) in the first radio frequency spectrum band. However, the UE may currently have its first transmit chain tuned or otherwise configured to the second radio frequency spectrum band. In response to the control signal scheduling the uplink resources for the uplink transmission, the UE may retune or otherwise reconfigure its first transmit chain from the second radio frequency spectrum band to the first radio frequency spectrum band. Once the first transmit chain is reconfigured, the uplink signal is ready for transmission, and the scheduled beginning of the uplink transmission has occurred, the UE may perform the uplink transmission to the base station on at least the first component carrier using its first transmit chain in the first radio frequency spectrum band. That is, the UE may reconfigure the first transmit chain to perform the uplink transmission on the first component carrier and use, in a FDD scenario, the second transmit chain to perform the uplink transmission on the second component carrier of the first radio frequency spectrum band.

More particularly and referring to timing diagram 300, the UE may be equipped with two (or more) the transmit chains. The second transmit chain may be configured otherwise support communications using at least one radio frequency spectrum band. The second transmit chain may be configured to support TDD communications. The first transmit chain may be configured or otherwise support communications using at least two radio frequency spectrum bands (e.g., the first radio frequency spectrum band and a second radio frequency spectrum band). The second transmit chain may be configured or otherwise support TDD and/or FDD communications.

During slot 305, the base station may transmit the control signal (e.g., a DCI and/or RRC grant) to the UE (and the UE may receive the DCI and/or RRC grant) scheduling uplink resources for the uplink transmission on at least the first component carrier. The base station may transmit the control signal on the first radio frequency spectrum band (e.g., for initial reception by the second transmit chain) and/or on both the first and second radio frequency spectrum bands (e.g., for reception by the first transmit chain and/or the second transmit chain). The control signal may identify the resources the UE is to use for the uplink transmission, identify at least the first component carrier, identify the scheduled beginning time (e.g., a timing offset indication, such as a K2/N2 value) for the uplink transmission, and the like.

However, during slot 305 the base station may not know the status of the transmit port for the first transmit chain of the UE (e.g., may not know whether the first transmit chain of the UE is tuned or otherwise configured to the first radio frequency spectrum band or the second radio frequency spectrum band). Accordingly and in the example illustrated in timing diagram 300, the first transmit chain of the UE may need to perform an uplink transmission (U2_1) or an uplink transmission (U0_1) during slot 310.

During slot 310, at time t1 the UE may begin reconfiguring the first transmit chain from the second radio frequency spectrum band to the first radio frequency spectrum band for the uplink transmission. As discussed, the base station may identify or otherwise select a duration of the monitoring window in which the base station attempts to blindly detect the uplink transmission. In the example illustrated in timing diagram 300, the monitoring window extends between time t1 and time t3, which in this example corresponds to the duration of slot 310. However, it is to be understood that the duration of the monitoring window may be different, e.g., may span one or more symbols/slots, with at least one of the one or more symbols/slots including the slot in which the uplink transmission is scheduled.

During slot 310 the UE may complete reconfiguring its first transmit chain to the first radio frequency spectrum band and begin performing the uplink transmission at time t2. As time t2 is within the monitoring window, the base station may receive the portion of the uplink transmission on the first component carrier of the first radio frequency spectrum band from the first transmit chain (e.g., uplink transmission U1_1). At the beginning of slot 310, the UE may use the second transmit chain to perform as portion of the uplink transmission on a second component carrier (e.g., in a FDD scenario).

In some aspects, the uplink transmission may span multiple slots. Accordingly and during slot 315, the UE may continue to use the first transmit chain to perform the uplink transmission on at least the first component carrier (U1_2) while the second transmit chain may be used to perform the uplink transmission on a second component carrier (U2_2) in the first radio frequency spectrum band.

In some examples, the control signal (e.g., grant) conveyed during slot 305 may schedule the uplink transmission over slots 310, 315, and 320. In another example, the control signal conveyed during slot 305 may schedule the uplink transmission during slot 310. In this example, during slot 315 the base station may transmit a second control signal scheduling another uplink transmission (or the remaining portion of the first uplink transmission).

Accordingly and during slot 320, the UE may continue to use at least the first transmit chain to perform the uplink transmission on the first component carrier (U1_3) while, in the FDD scenario, the second transmit chain is used to perform the uplink transmission on the second component carrier (U2_3) in the first radio frequency spectrum band. During slot 325, the first and/or transmit chains may be configured for either downlink (D) or uplink (U) communications, e.g., after the uplink transmission is completed.

Figure 4:
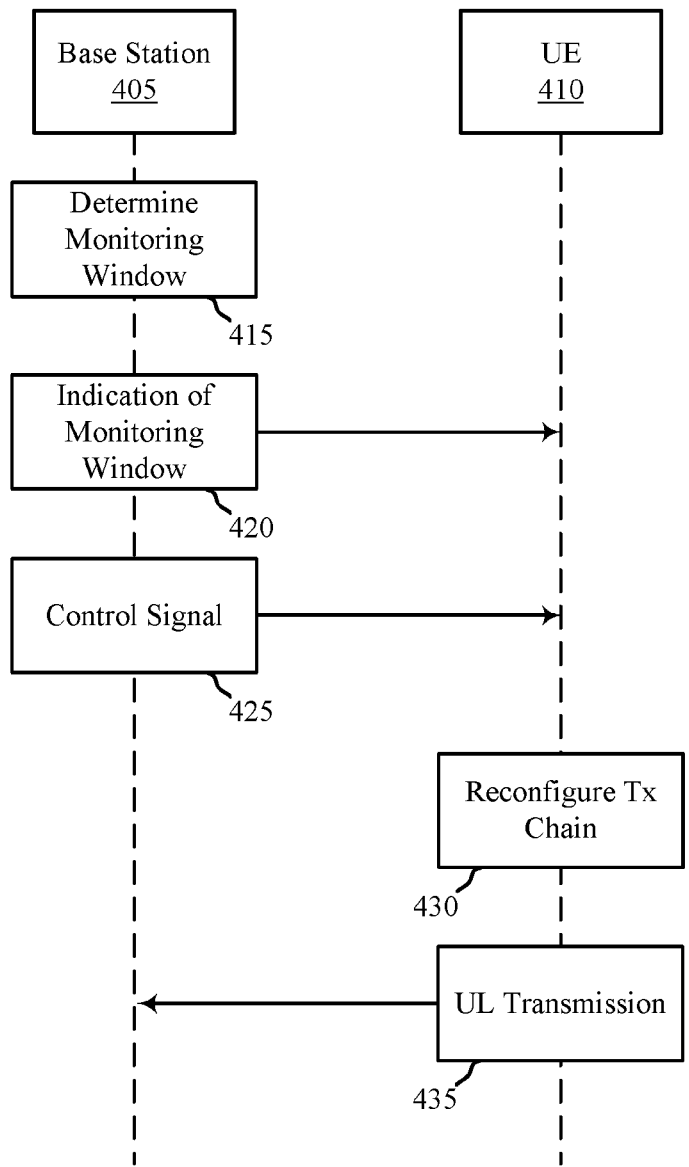
FIG. 4 illustrates an example of a process that supports carrier aggregation uplink switch gap detection and report in accordance with aspects of the present disclosure.

FIG. 4 illustrates an example of a process 400 that supports carrier aggregation uplink switch gap detection and report in accordance with aspects of the present disclosure. In some examples, process 400 may implement aspects of wireless communication systems 100 and/or 200 and/or timing diagram 300. Aspects of process 400 may be implemented by a base station and/or UE, which may be examples of the corresponding devices described herein.

At 415, base station 405 may determine a monitoring window to use to monitor for uplink transmissions from UE 410. The monitoring window may determine based, at least in some aspects, on a capability of UE 410. For example, base station 405 may receive a capability message from UE 410, and select the monitoring window (e.g., a duration of the monitoring window) based on the UE 410 capability. In some aspects, the capability message may convey an indication of a reconfiguration timing for UE 410 to reconfigure its first transmit chain to the first radio frequency spectrum band. The reconfiguration time may provide an indication of the time that it takes for UE 410 to retune or otherwise reconfigure a first transmit chain from a first radio frequency spectrum band to a second radio frequency spectrum band, or vice versa. In some aspects, the monitoring window may span one or more slots, with at least a first slot of the one or more slots including the slot in which the uplink transmission is scheduled.

At 420, base station 405 may transmit (and UE 410 may receive) an indication of the monitoring window. For example, base station 405 may transmit the indication of the monitoring window in a RRC configuration/reconfiguration signal, and the like. In some examples, the indication of the monitoring window may be conveyed in a control signal scheduling a particular uplink transmission from UE 410.

At 425, base station 405 may transmit (and UE 410 may receive) a control signal scheduling uplink resources for an uplink transmission from UE 410. The uplink transmission may be scheduled on at least a first component carrier of the first radio frequency spectrum band. The control signal may include a DCI and/or RRC grant scheduling the uplink transmission.

At 430, UE 410 may, based on the control signal scheduling the uplink transmission, reconfigure its first transmit chain from the second radio frequency spectrum band to the first radio frequency spectrum band for the uplink transmission. For example, UE 410 may retune various components, functions, etc., of the first transmit chain to the first radio frequency spectrum band.

At 435, UE 410 may transmit (and base station 405 may receive) the uplink transmission using the resources identified in the control signal. For example, UE 410 may transmit a first portion of the uplink transmission on the reconfigured first transmit chain in at least the first component carrier and transmit a second portion of the uplink transmission afterwards on the first transmit chain in the first component carrier (e.g., in a TDD scenario). Broadly, the uplink transmission may include transmitting uplink data signals, uplink control signals, PRACH signals, uplink reference signals, and the like.

In some aspects, this may include UE 410 determining the timing for the uplink transmission based on a timing offset indicated in the control signal (e.g., a K2 value). UE 410 may determine that the first transmit chain can be reconfigured before expiration of the monitoring window and reconfigure the first transmit chain accordingly.

In some aspects, this may include UE 410 determining the timing for the uplink transmission, but determining that the first transmit chain will be reconfigured after expiration of the monitoring window. In this situation, UE 410 may forego transmitting the uplink transmission and, instead, transmit a UE capability message indicating a reconfiguration time for the first transmit chain. That is, UE 410 may update its reconfiguration time (e.g., its UE capability) based on determining that the first transmit chain reconfiguration extends past the monitoring window.

In some aspects, this may include UE 410 including in the indication in the uplink transmission that UE 410 has reconfigured the first transmit chain. The indication may include one or more bits associated with the beta-offset table, a reserved HARQ value, and/or a reserved CSI value. That is, the indication may include one or more bits via a resource determined using a resource allocation mechanism which is decided by a value in a beta-offset table. The value in the beta-offset table may include one or more entries of a HARQ table and/or one or more entries of a CSI table. In some aspects, the beta-offset table is for the indication of monitoring windows used by the base station.

Figure 5:
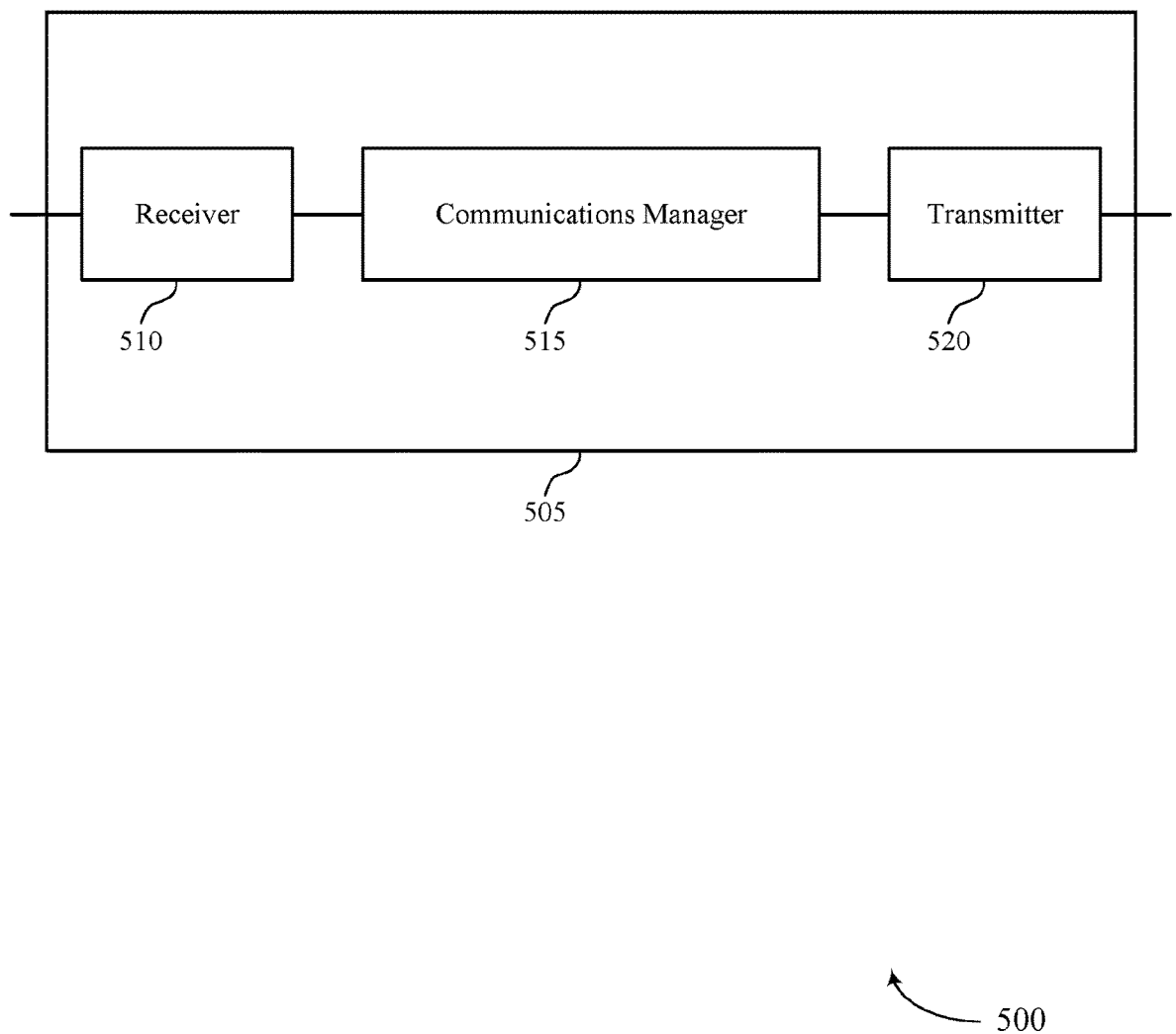
FIGS. 5 and 6 show block diagrams of devices that support carrier aggregation uplink switch gap detection and report in accordance with aspects of the present disclosure.

FIG. 5 shows a block diagram 500 of a device 505 that supports carrier aggregation uplink switch gap detection and report in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to carrier aggregation uplink switch gap detection and report, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a base station, an indication of a monitoring window used by the base station to monitor for uplink transmissions from the UE, receive a control signal scheduling uplink resources for an uplink transmission by the UE on at least a first component carrier, the first component carrier in a first radio frequency spectrum band, reconfigure, in response to the received control signal, a first transmit chain of the UE from a second component carrier in a second radio frequency spectrum band to the first component carrier in the first radio frequency spectrum band for the uplink transmission, and transmit, based on the indicated monitoring window and using at least the reconfigured first transmit chain, the uplink transmission on the first component carrier using the scheduled uplink resources. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
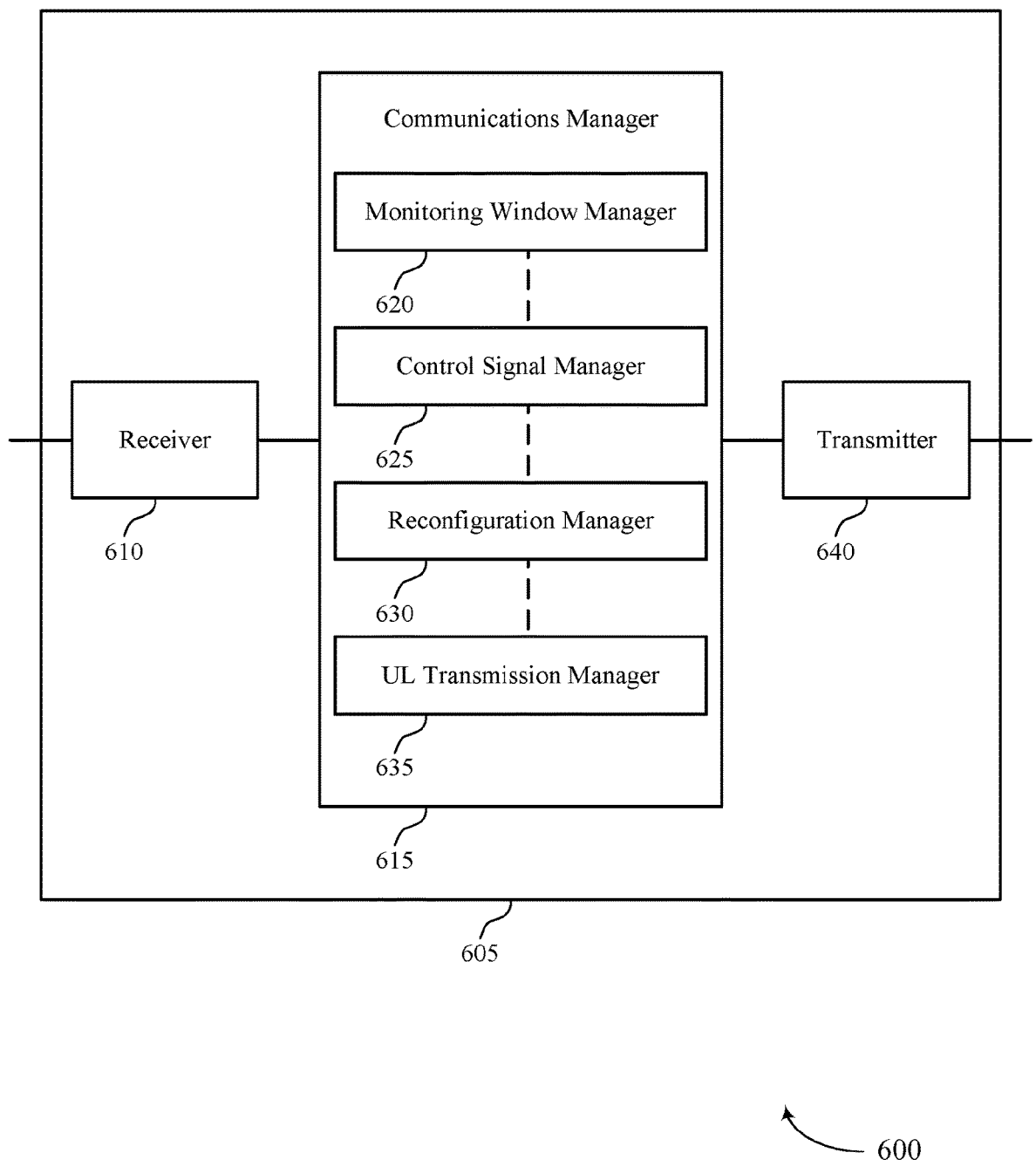

FIG. 6 shows a block diagram 600 of a device 605 that supports carrier aggregation uplink switch gap detection and report in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to carrier aggregation uplink switch gap detection and report, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a monitoring window manager 620, a control signal manager 625, a reconfiguration manager 630, and an UL transmission manager 635. The communications manager 615 may be an example of aspects of the communications manager 810 described herein.

The monitoring window manager 620 may receive, from a base station, an indication of a monitoring window used by the base station to monitor for uplink transmissions from the UE.

The control signal manager 625 may receive a control signal scheduling uplink resources for an uplink transmission by the UE on at least a first component carrier, the first component carrier in a first radio frequency spectrum band.

The reconfiguration manager 630 may reconfigure, in response to the received control signal, a first transmit chain of the UE from a second component carrier in a second radio frequency spectrum band to the first component carrier in the first radio frequency spectrum band for the uplink transmission.

The UL transmission manager 635 may transmit, based on the indicated monitoring window and using at least the reconfigured first transmit chain, the uplink transmission on the first component carrier using the scheduled uplink resources.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
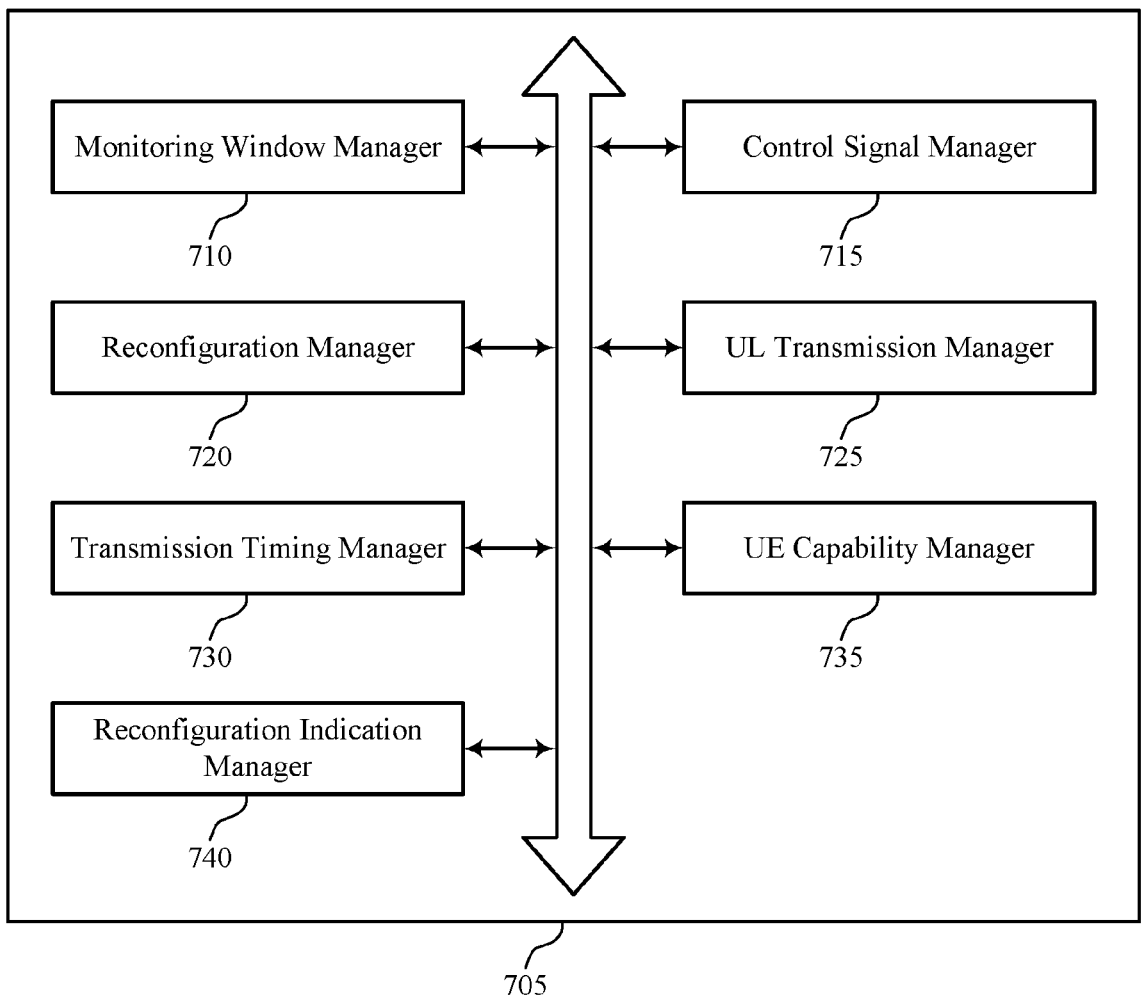
FIG. 7 shows a block diagram of a communications manager that supports carrier aggregation uplink switch gap detection and report in accordance with aspects of the present disclosure.

FIG. 7 shows a block diagram 700 of a communications manager 705 that supports carrier aggregation uplink switch gap detection and report in accordance with aspects of the present disclosure. The communications manager 705 may be an example of aspects of a communications manager 515, a communications manager 615, or a communications manager 810 described herein. The communications manager 705 may include a monitoring window manager 710, a control signal manager 715, a reconfiguration manager 720, an UL transmission manager 725, a transmission timing manager 730, an UE capability manager 735, and a reconfiguration indication manager 740. Each of these modules may communicate, directly or indirectly, with one another (e.g., via one or more buses).

The monitoring window manager 710 may receive, from a base station, an indication of a monitoring window used by the base station to monitor for uplink transmissions from the UE. In some cases, the monitoring window spans one or more slots, with a first slot of the one or more slots including a slot in which the multi-carrier transmission is scheduled. In some cases, the indication of the monitoring window is received in a RRC configuration signal, or RRC reconfiguration signal, or a system information signal, or a combination thereof.

The control signal manager 715 may receive a control signal scheduling uplink resources for an uplink transmission by the UE on at least a first component carrier, the first component carrier in a first radio frequency spectrum band. In some cases, the control signal includes a RRC grant, or a DCI grant, or a combination thereof.

The reconfiguration manager 720 may reconfigure, in response to the received control signal, a first transmit chain of the UE from a second component carrier in a second radio frequency spectrum band to the first component carrier in the first radio frequency spectrum band for the uplink transmission.

The UL transmission manager 725 may transmit, based on the indicated monitoring window and using at least the reconfigured first transmit chain, the uplink transmission on the first component carrier using the scheduled uplink resources. In some cases, the multi-carrier transmission includes an uplink data signal transmission, or an uplink control signal transmission, or a reference signal transmission, a PRACH, or a combination thereof.

The transmission timing manager 730 may identify a timing for the multi-carrier transmission based on a timing offset indicated by the received control signal. In some examples, the transmission timing manager 730 may determine, based on the identified timing, that the first transmit chain can be reconfigured before expiration of the indicated monitoring window. In some examples, the transmission timing manager 730 may reconfigure the first transmit chain based on the determining.

The UE capability manager 735 may transmit a UE capability message indicating a reconfiguration time for the first transmit chain, where a duration of the monitoring window is based on the UE capability message. In some cases, the duration of the monitoring window is cell-specific and based on a largest switching gap reported by at least one UE to the base station. In some cases, the duration of the monitoring window is UE-specific for the UE based at least in part the UE capability message.

The reconfiguration indication manager 740 may transmit, in the multi-carrier transmission, an indication that the UE has reconfigured the first transmit chain of the UE. In some cases, the indication includes one or more bits via a resource determined using a resource allocation mechanism which is decided by a value in a beta-offset table. In some cases, the value in the beta-offset table includes one or more entries of a HARQ table, or one or more entries of a CSI table, or a combination thereof. In some cases, the beta-offset table is for the indication of monitoring windows used by the base station.

Figure 8:
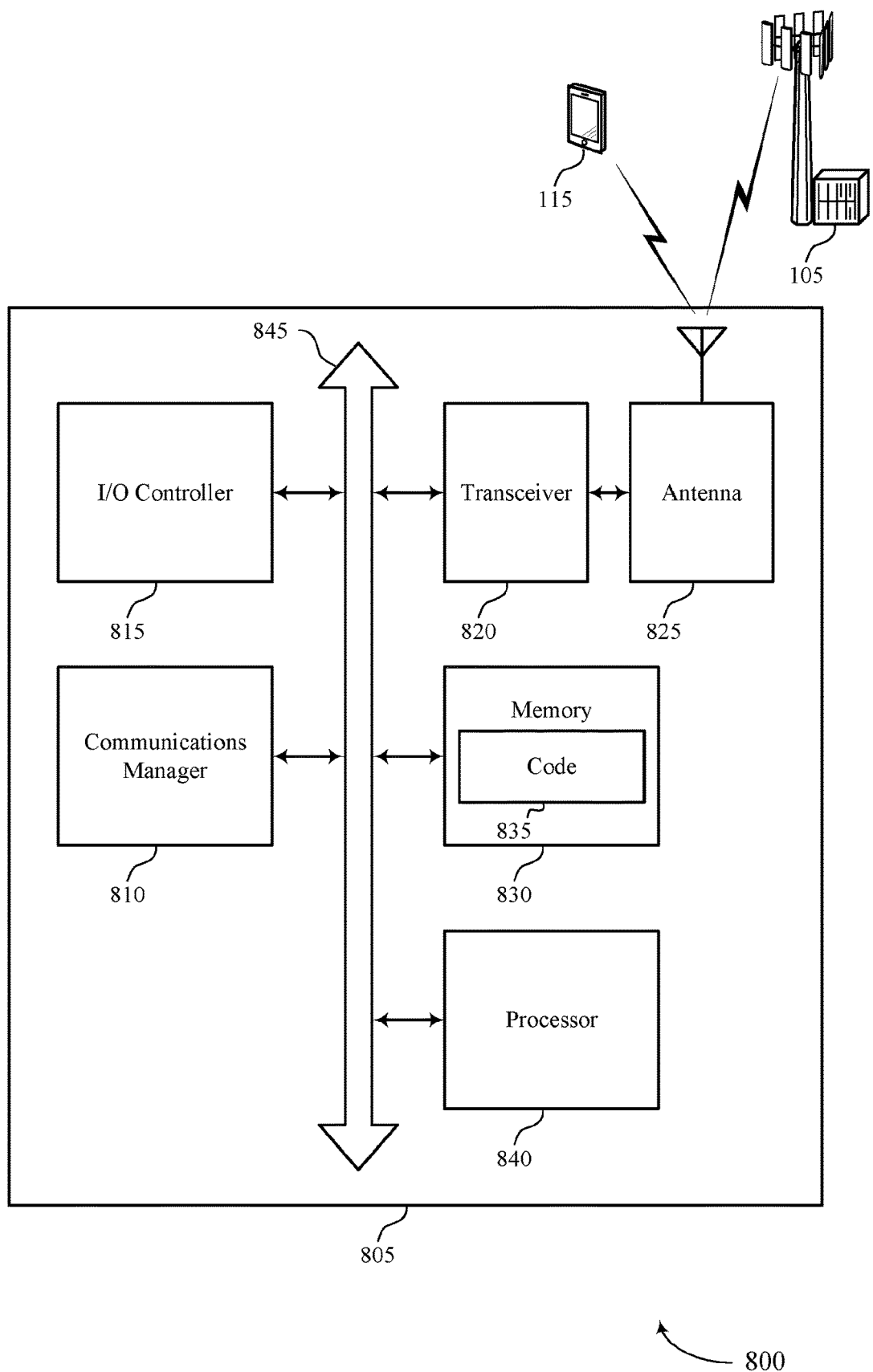
FIG. 8 shows a diagram of a system including a device that supports carrier aggregation uplink switch gap detection and report in accordance with aspects of the present disclosure.

FIG. 8 shows a diagram of a system 800 including a device 805 that supports carrier aggregation uplink switch gap detection and report in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a base station, an indication of a monitoring window used by the base station to monitor for uplink transmissions from the UE, receive a control signal scheduling uplink resources for an uplink transmission by the UE on at least a first component carrier, the first component carrier in a first radio frequency spectrum band, reconfigure, in response to the received control signal, a first transmit chain of the UE from a second component carrier in a second radio frequency spectrum band to the first component carrier in the first radio frequency spectrum band for the uplink transmission, and transmit, based on the indicated monitoring window and using at least the reconfigured first transmit chain, the uplink transmission on the first component carrier using the scheduled uplink resources.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting carrier aggregation uplink switch gap detection and report).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
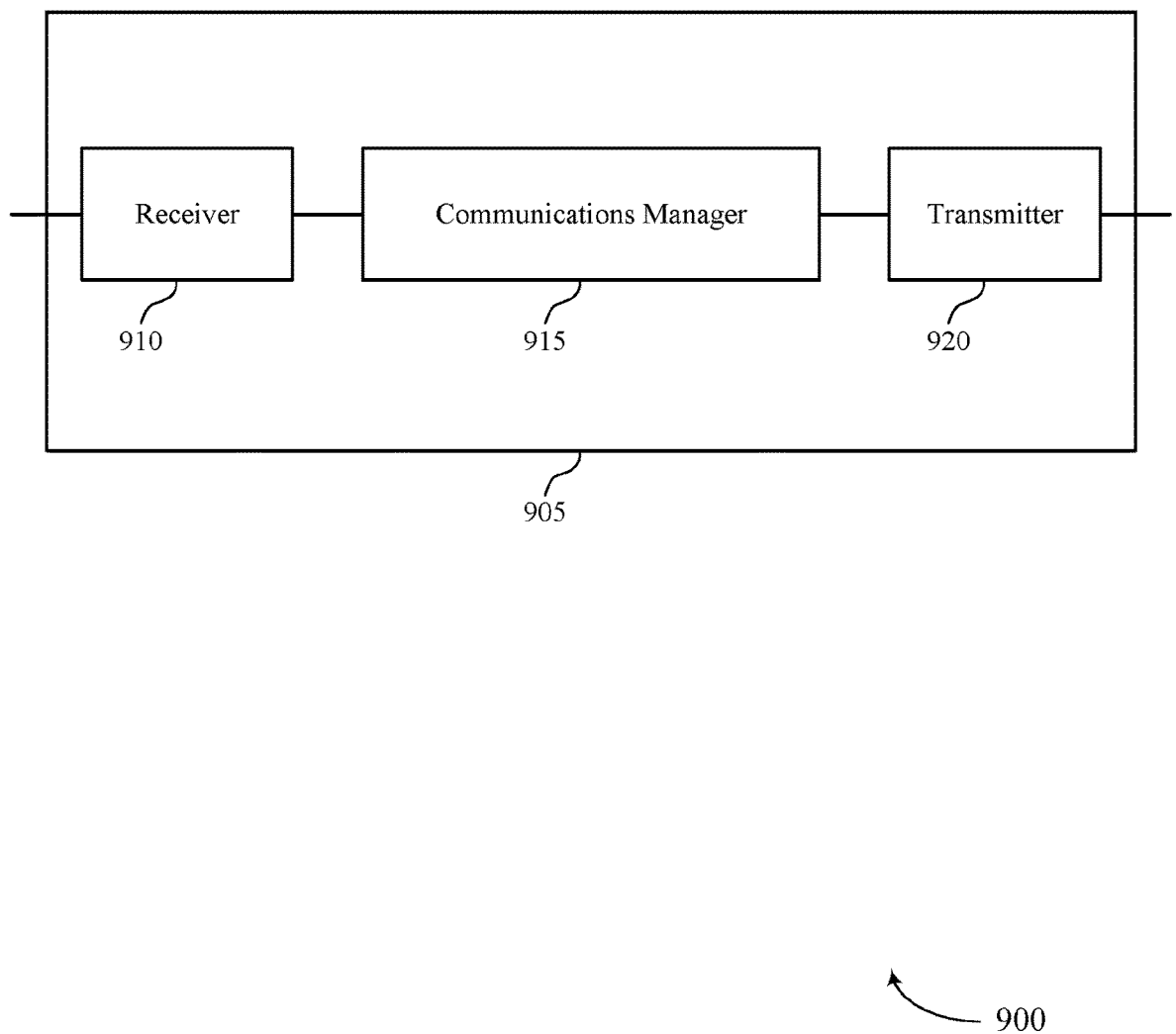
FIGS. 9 and 10 show block diagrams of devices that support carrier aggregation uplink switch gap detection and report in accordance with aspects of the present disclosure.

FIG. 9 shows a block diagram 900 of a device 905 that supports carrier aggregation uplink switch gap detection and report in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to carrier aggregation uplink switch gap detection and report, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may determine, based on a capability of the UE, a monitoring window to use to monitor for uplink transmissions from a UE, transmit, to the UE, an indication of the monitoring window, transmit, to the UE, a control signal scheduling uplink resources for an uplink transmission by the UE on at least a first component carrier, the first component carrier in a first radio frequency spectrum band, and receive, based on the monitoring window, the uplink transmission on the first component carrier using the scheduled uplink resources. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
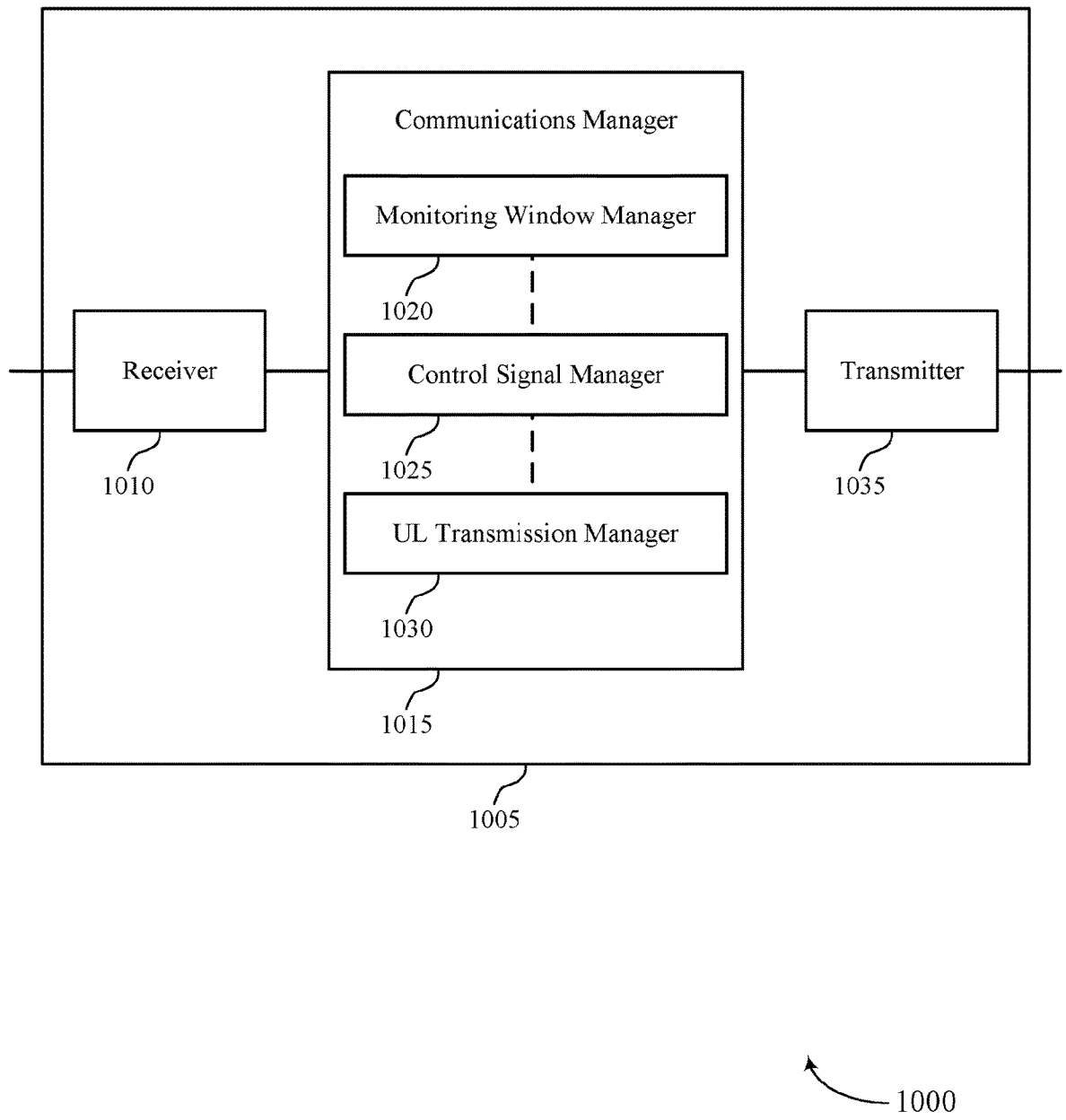

FIG. 10 shows a block diagram 1000 of a device 1005 that supports carrier aggregation uplink switch gap detection and report in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to carrier aggregation uplink switch gap detection and report, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a monitoring window manager 1020, a control signal manager 1025, and an UL transmission manager 1030. The communications manager 1015 may be an example of aspects of the communications manager 1210 described herein.

The monitoring window manager 1020 may determine, based on a capability of the UE, a monitoring window to use to monitor for uplink transmissions from a UE and transmit, to the UE, an indication of the monitoring window.

The control signal manager 1025 may transmit, to the UE, a control signal scheduling uplink resources for an uplink transmission by the UE on at least a first component carrier, the first component carrier in a first radio frequency spectrum band.

The UL transmission manager 1030 may receive, based on the monitoring window, the uplink transmission on the first component carrier using the scheduled uplink resources.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
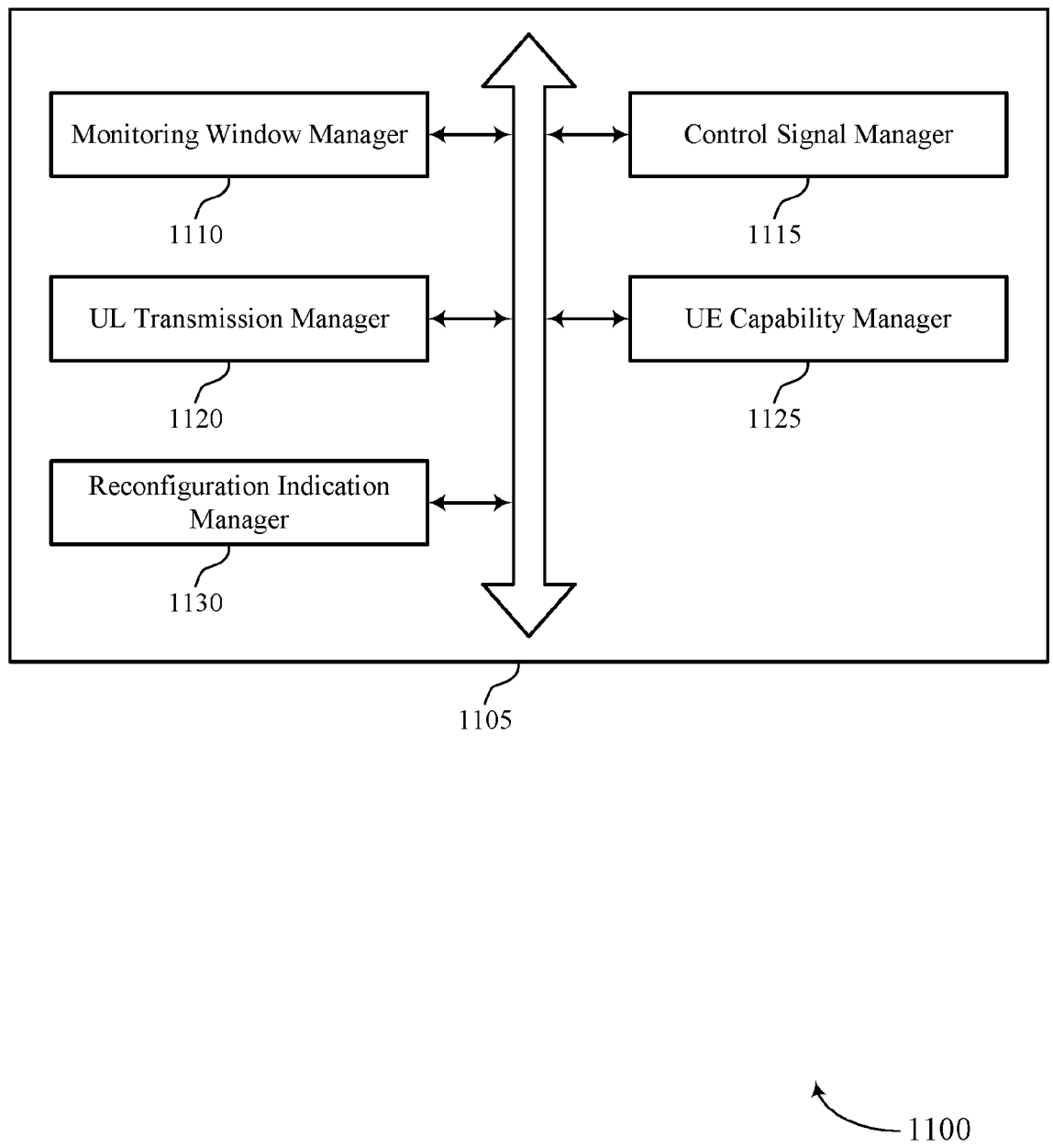
FIG. 11 shows a block diagram of a communications manager that supports carrier aggregation uplink switch gap detection and report in accordance with aspects of the present disclosure.

FIG. 11 shows a block diagram 1100 of a communications manager 1105 that supports carrier aggregation uplink switch gap detection and report in accordance with aspects of the present disclosure. The communications manager 1105 may be an example of aspects of a communications manager 915, a communications manager 1015, or a communications manager 1210 described herein. The communications manager 1105 may include a monitoring window manager 1110, a control signal manager 1115, an UL transmission manager 1120, an UE capability manager 1125, and a reconfiguration indication manager 1130. Each of these modules may communicate, directly or indirectly, with one another (e.g., via one or more buses).

The monitoring window manager 1110 may determine, based on a capability of the UE, a monitoring window to use to monitor for uplink transmissions from a UE. In some examples, the monitoring window manager 1110 may transmit, to the UE, an indication of the monitoring window. In some cases, the monitoring window spans one or more slots, with a first slot of the one or more slots including a slot in which the multi-carrier transmission is scheduled. In some cases, the indication of the monitoring window is transmitted in a RRC configuration signal, or a RRC reconfiguration signal, or a system information signal, or a combination thereof.

The control signal manager 1115 may transmit, to the UE, a control signal scheduling uplink resources for an uplink transmission by the UE on at least a first component carrier, the first component carrier in a first radio frequency spectrum band. In some cases, the control signal includes a RRC grant, or a DCI grant, or a combination thereof.

The UL transmission manager 1120 may receive, based on the monitoring window, the uplink transmission on the first component carrier using the scheduled uplink resources. In some cases, the multi-carrier transmission includes an uplink data signal transmission, or an uplink control signal transmission, or a reference signal transmission, or a PRACH transmission, or a combination thereof.

The UE capability manager 1125 may receive a UE capability message indicating a reconfiguration time for the first transmit chain of the UE, where a duration of the monitoring window is based on the UE capability message. In some cases, the duration of the monitoring window is cell-specific and based on a largest switching gap reported by at least one UE to the base station. In some cases, the duration of the monitoring window is UE-specific for the UE based at least in part the UE capability message.

The reconfiguration indication manager 1130 may receive, in the multi-carrier transmission, an indication that the UE reconfigured the first transmit chain of the UE. In some cases, the indication includes one or more bits via a resource determined using a resource allocation mechanism which is decided by a value in a beta-offset table. In some cases, the value in the beta-offset table includes one or more entries of a HARQ table, or one or more entries of a CSI table, or a combination thereof. In some cases, the beta-offset table is for the indication of monitoring windows used by the base station.

Figure 12:
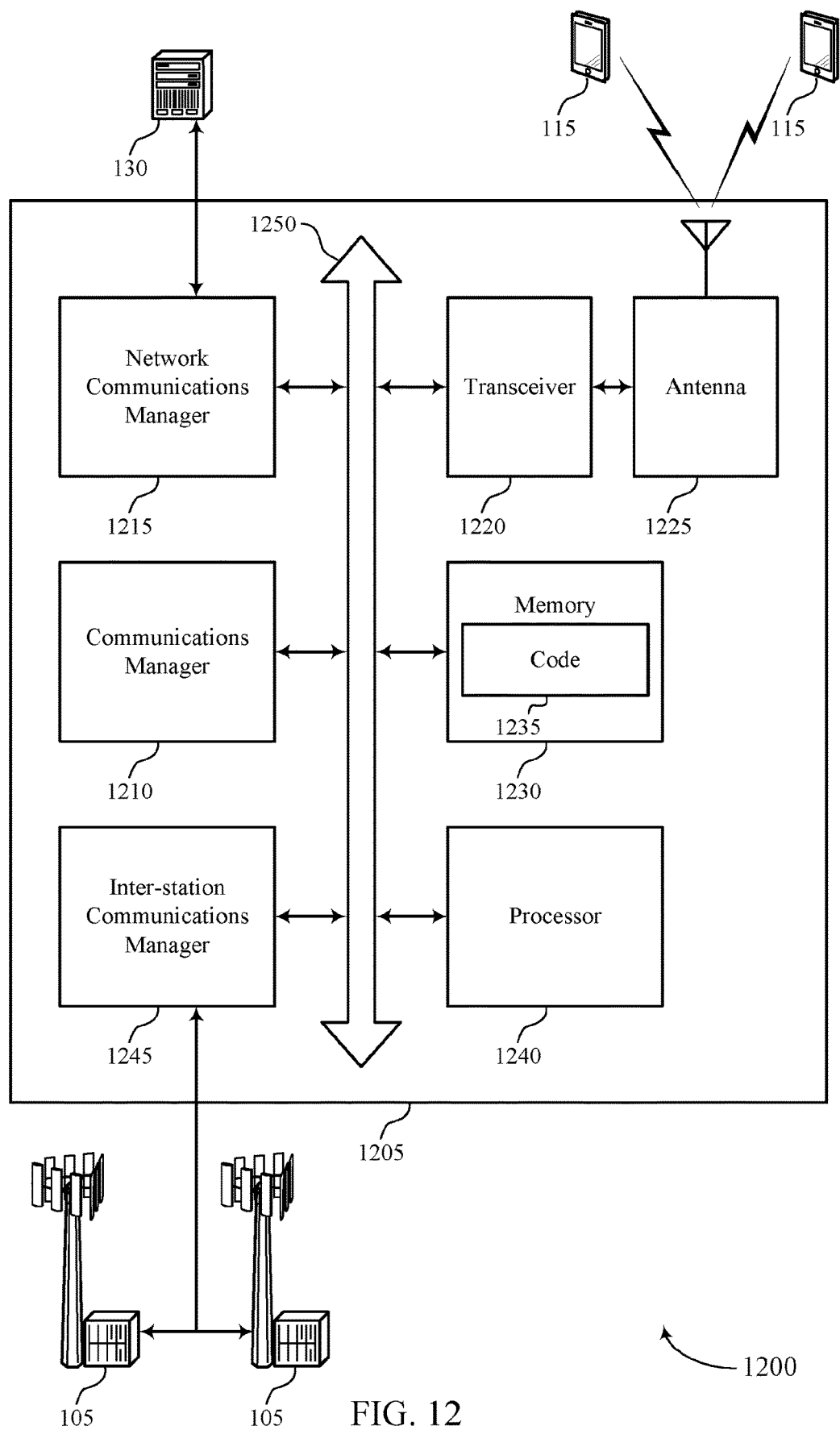
FIG. 12 shows a diagram of a system including a device that supports carrier aggregation uplink switch gap detection and report in accordance with aspects of the present disclosure.

FIG. 12 shows a diagram of a system 1200 including a device 1205 that supports carrier aggregation uplink switch gap detection and report in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may determine, based on a capability of the UE, a monitoring window to use to monitor for uplink transmissions from a UE, transmit, to the UE, an indication of the monitoring window, transmit, to the UE, a control signal scheduling uplink resources for an uplink transmission by the UE on at least a first component carrier, the first component carrier in a first radio frequency spectrum band, and receive, based on the monitoring window, the uplink transmission on the first component carrier using the scheduled uplink resources.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting carrier aggregation uplink switch gap detection and report).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
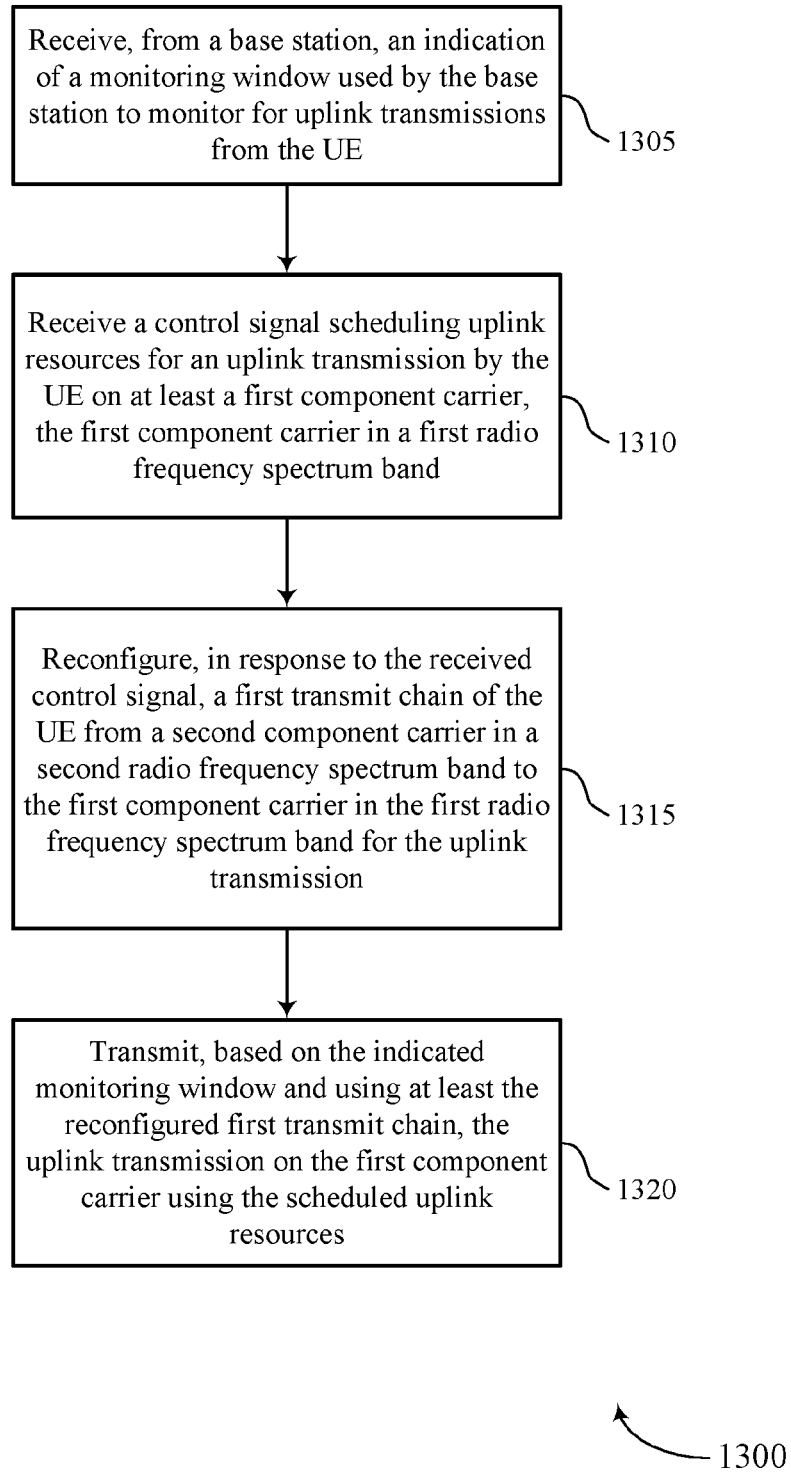
FIGS. 13 through 17 show flowcharts illustrating methods that support carrier aggregation uplink switch gap detection and report in accordance with aspects of the present disclosure.

FIG. 13 shows a flowchart illustrating a method 1300 that supports carrier aggregation uplink switch gap detection and report in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station, an indication of a monitoring window used by the base station to monitor for uplink transmissions from the UE. The operations of 1305 may be performed according to the methods described herein. In some examples, aspects of the operations of 1305 may be performed by a monitoring window manager as described with reference to FIGS. 5 through 8.

At 1310, the UE may receive a control signal scheduling uplink resources for an uplink transmission by the UE on at least a first component carrier, the first component carrier in a first radio frequency spectrum band. The operations of 1310 may be performed according to the methods described herein. In some examples, aspects of the operations of 1310 may be performed by a control signal manager as described with reference to FIGS. 5 through 8.

At 1315, the UE may reconfigure, in response to the received control signal, a first transmit chain of the UE from a second component carrier in a second radio frequency spectrum band to the first component carrier in the first radio frequency spectrum band for the uplink transmission. The operations of 1315 may be performed according to the methods described herein. In some examples, aspects of the operations of 1315 may be performed by a reconfiguration manager as described with reference to FIGS. 5 through 8.

At 1320, the UE may transmit, based on the indicated monitoring window and using at least the reconfigured first transmit chain, the uplink transmission on the first component carrier using the scheduled uplink resources. The operations of 1320 may be performed according to the methods described herein. In some examples, aspects of the operations of 1320 may be performed by an UL transmission manager as described with reference to FIGS. 5 through 8.

Figure 14:
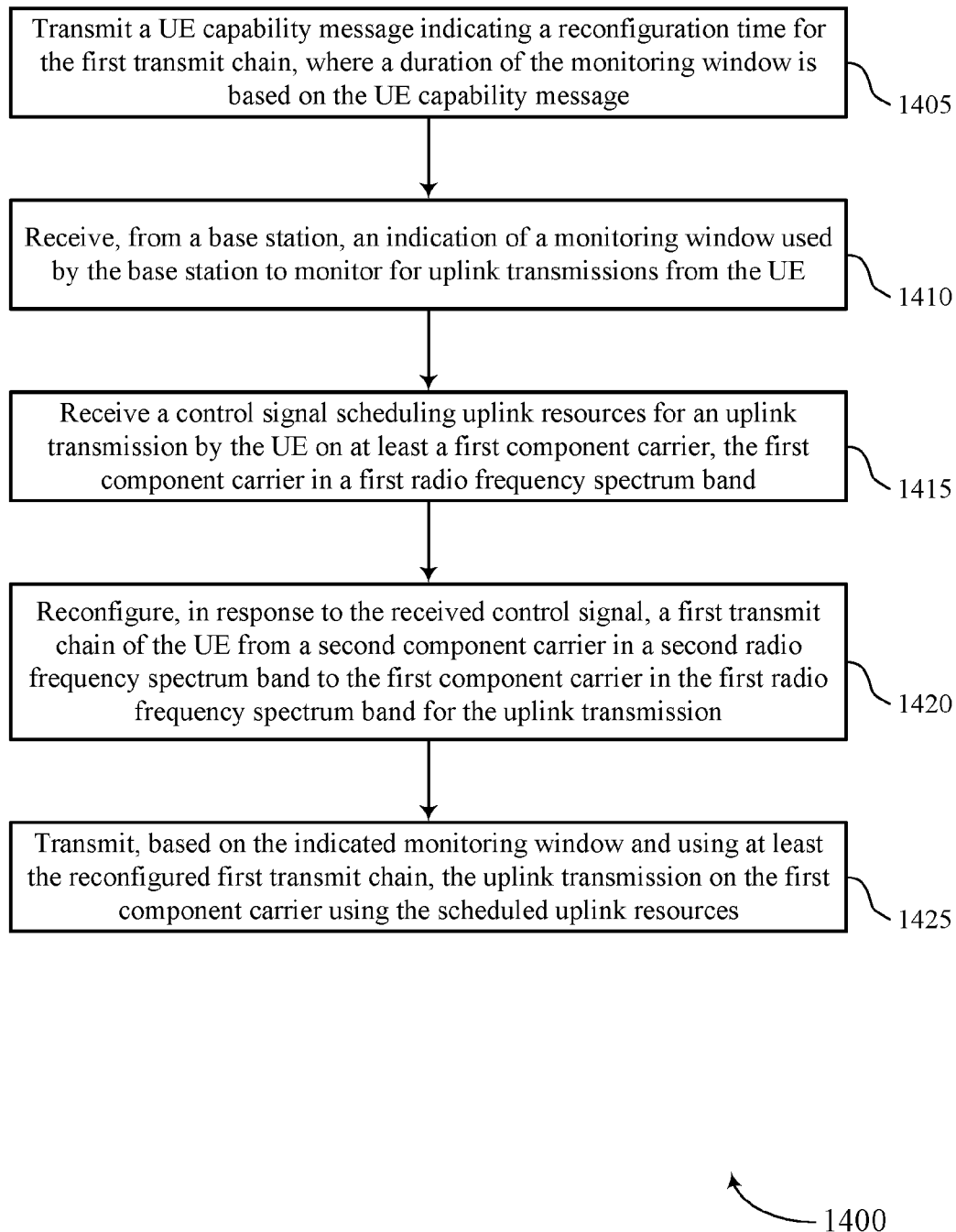

FIG. 14 shows a flowchart illustrating a method 1400 that supports carrier aggregation uplink switch gap detection and report in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may transmit a UE capability message indicating a reconfiguration time for the first transmit chain, where a duration of the monitoring window is based on the UE capability message. The operations of 1405 may be performed according to the methods described herein. In some examples, aspects of the operations of 1405 may be performed by an UE capability manager as described with reference to FIGS. 5 through 8.

At 1410, the UE may receive, from a base station, an indication of a monitoring window used by the base station to monitor for uplink transmissions from the UE. The operations of 1410 may be performed according to the methods described herein. In some examples, aspects of the operations of 1410 may be performed by a monitoring window manager as described with reference to FIGS. 5 through 8.

At 1415, the UE may receive a control signal scheduling uplink resources for an uplink transmission by the UE on at least a first component carrier, the first component carrier in a first radio frequency spectrum band. The operations of 1415 may be performed according to the methods described herein. In some examples, aspects of the operations of 1415 may be performed by a control signal manager as described with reference to FIGS. 5 through 8.

At 1420, the UE may reconfigure, in response to the received control signal, a first transmit chain of the UE from a second component carrier in a second radio frequency spectrum band to the first component carrier in the first radio frequency spectrum band for the uplink transmission. The operations of 1420 may be performed according to the methods described herein. In some examples, aspects of the operations of 1420 may be performed by a reconfiguration manager as described with reference to FIGS. 5 through 8.

At 1425, the UE may transmit, based on the indicated monitoring window and using at least the reconfigured first transmit chain, the uplink transmission on the first component carrier using the scheduled uplink resources. The operations of 1425 may be performed according to the methods described herein. In some examples, aspects of the operations of 1425 may be performed by an UL transmission manager as described with reference to FIGS. 5 through 8.

Figure 15:
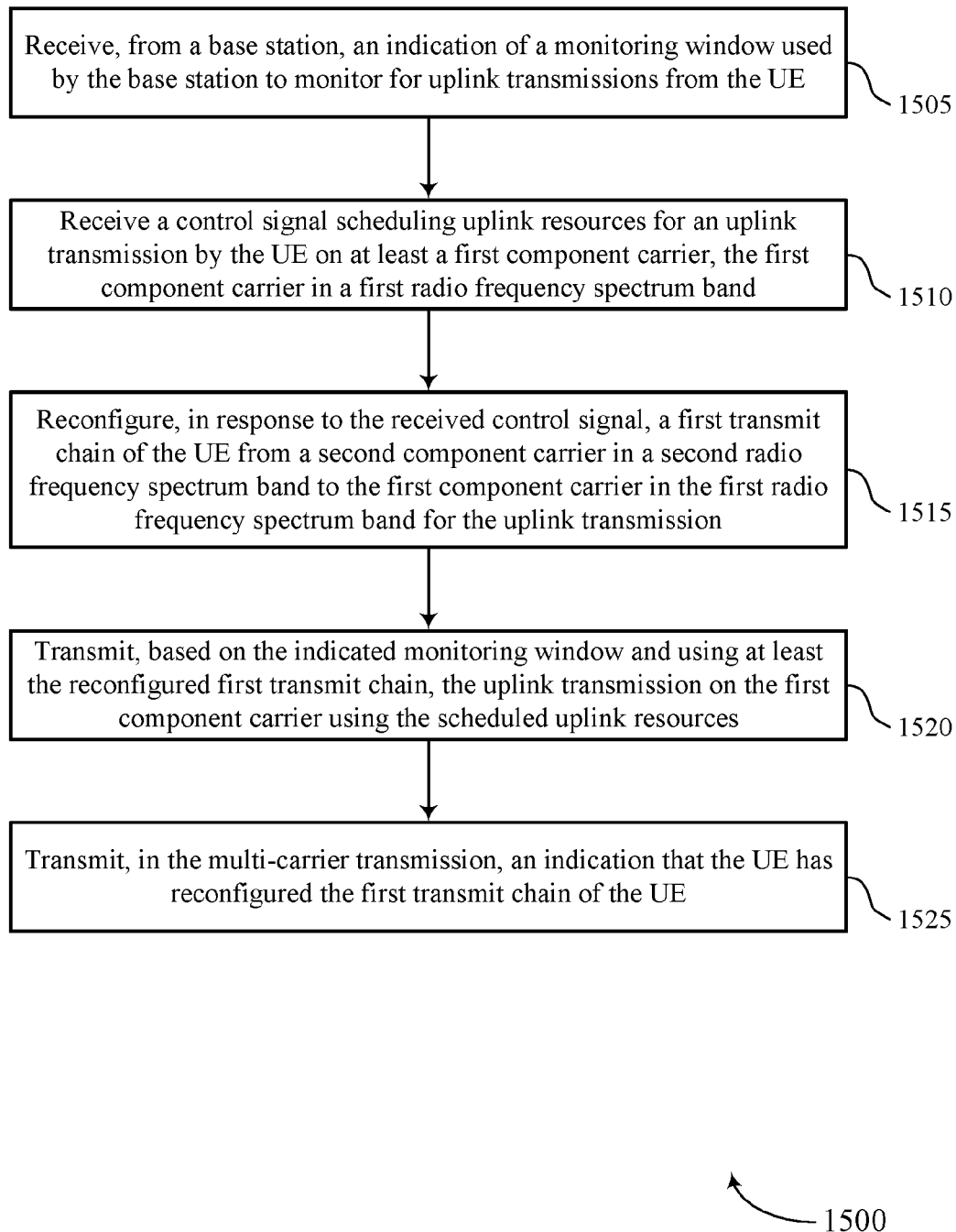

FIG. 15 shows a flowchart illustrating a method 1500 that supports carrier aggregation uplink switch gap detection and report in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, an indication of a monitoring window used by the base station to monitor for uplink transmissions from the UE. The operations of 1505 may be performed according to the methods described herein. In some examples, aspects of the operations of 1505 may be performed by a monitoring window manager as described with reference to FIGS. 5 through 8.

At 1510, the UE may receive a control signal scheduling uplink resources for an uplink transmission by the UE on at least a first component carrier, the first component carrier in a first radio frequency spectrum band. The operations of 1510 may be performed according to the methods described herein. In some examples, aspects of the operations of 1510 may be performed by a control signal manager as described with reference to FIGS. 5 through 8.

At 1515, the UE may reconfigure, in response to the received control signal, a first transmit chain of the UE from a second component carrier in a second radio frequency spectrum band to the first component carrier in the first radio frequency spectrum band for the uplink transmission. The operations of 1515 may be performed according to the methods described herein. In some examples, aspects of the operations of 1515 may be performed by a reconfiguration manager as described with reference to FIGS. 5 through 8.

At 1520, the UE may transmit, based on the indicated monitoring window and using at least the reconfigured first transmit chain, the uplink transmission on the first component carrier using the scheduled uplink resources. The operations of 1520 may be performed according to the methods described herein. In some examples, aspects of the operations of 1520 may be performed by an UL transmission manager as described with reference to FIGS. 5 through 8.

At 1525, the UE may transmit, in the multi-carrier transmission, an indication that the UE has reconfigured the first transmit chain of the UE. The operations of 1525 may be performed according to the methods described herein. In some examples, aspects of the operations of 1525 may be performed by a reconfiguration indication manager as described with reference to FIGS. 5 through 8.

Figure 16:
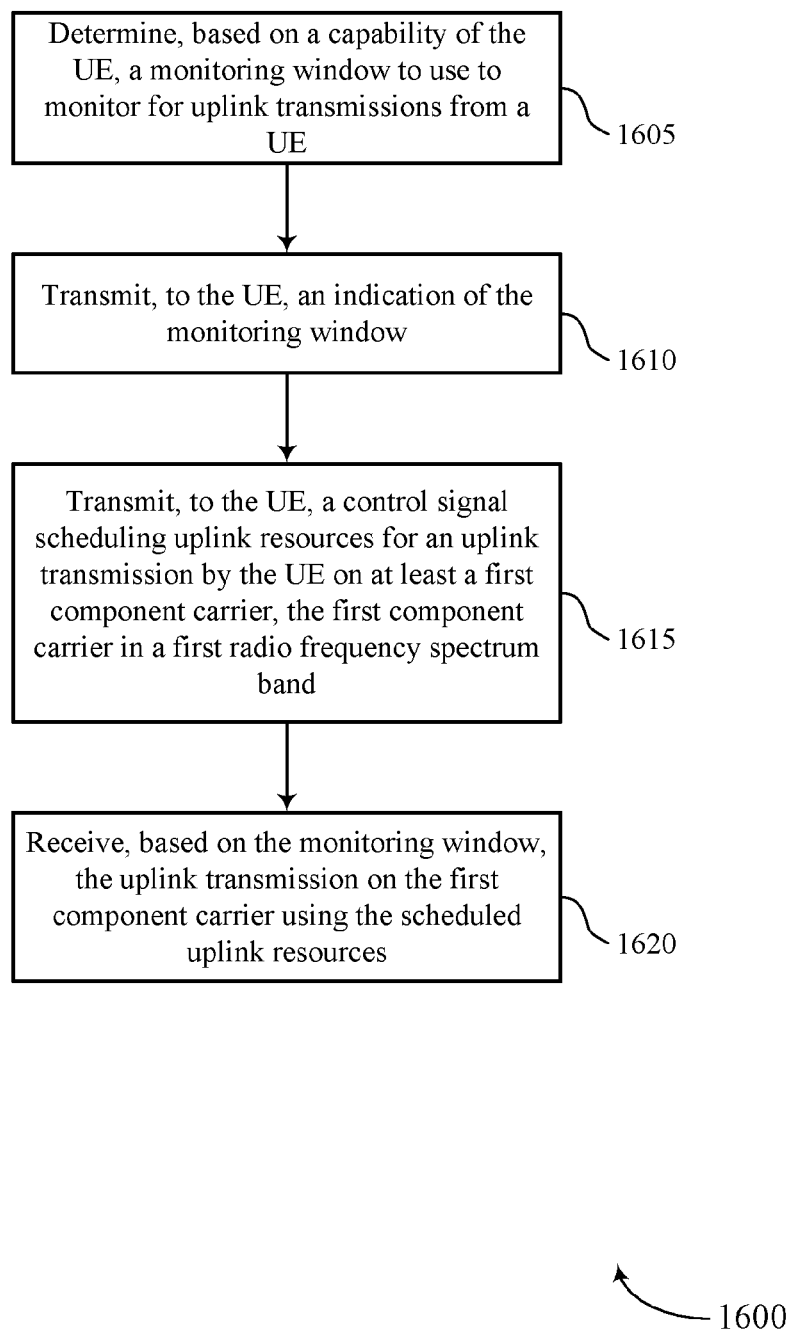

FIG. 16 shows a flowchart illustrating a method 1600 that supports carrier aggregation uplink switch gap detection and report in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may determine, based on a capability of the UE, a monitoring window to use to monitor for uplink transmissions from a UE. The operations of 1605 may be performed according to the methods described herein. In some examples, aspects of the operations of 1605 may be performed by a monitoring window manager as described with reference to FIGS. 9 through 12.

At 1610, the base station may transmit, to the UE, an indication of the monitoring window. The operations of 1610 may be performed according to the methods described herein. In some examples, aspects of the operations of 1610 may be performed by a monitoring window manager as described with reference to FIGS. 9 through 12.

At 1615, the base station may transmit, to the UE, a control signal scheduling uplink resources for an uplink transmission by the UE on at least a first component carrier, the first component carrier in a first radio frequency spectrum band. The operations of 1615 may be performed according to the methods described herein. In some examples, aspects of the operations of 1615 may be performed by a control signal manager as described with reference to FIGS. 9 through 12.

At 1620, the base station may receive, based on the monitoring window, the uplink transmission on the first component carrier using the scheduled uplink resources. The operations of 1620 may be performed according to the methods described herein. In some examples, aspects of the operations of 1620 may be performed by an UL transmission manager as described with reference to FIGS. 9 through 12.

Figure 17:
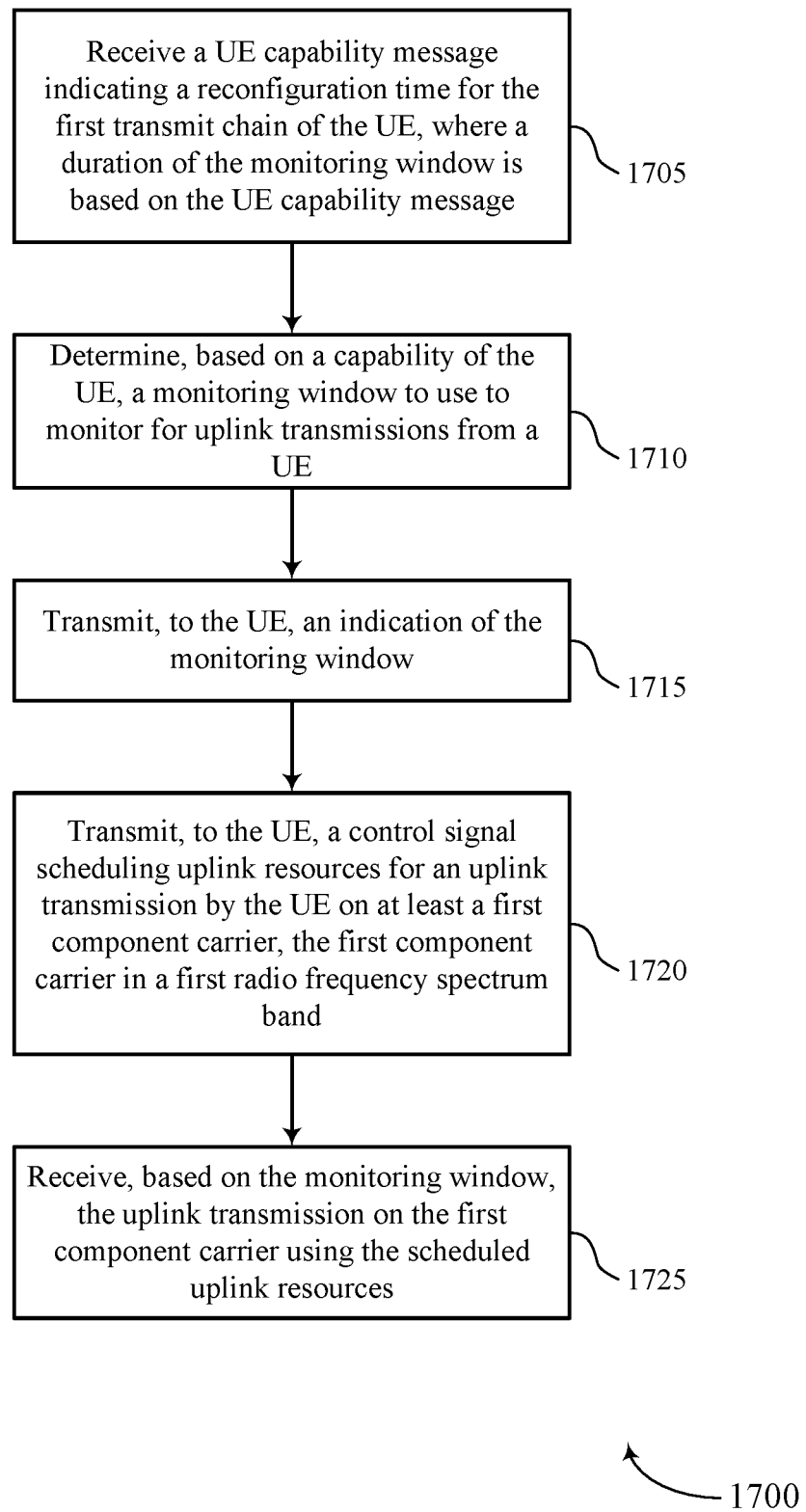

FIG. 17 shows a flowchart illustrating a method 1700 that supports carrier aggregation uplink switch gap detection and report in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may receive a UE capability message indicating a reconfiguration time for the first transmit chain of the UE, where a duration of the monitoring window is based on the UE capability message. The operations of 1705 may be performed according to the methods described herein. In some examples, aspects of the operations of 1705 may be performed by an UE capability manager as described with reference to FIGS. 9 through 12.

At 1710, the base station may determine, based on a capability of the UE, a monitoring window to use to monitor for uplink transmissions from a UE. The operations of 1710 may be performed according to the methods described herein. In some examples, aspects of the operations of 1710 may be performed by a monitoring window manager as described with reference to FIGS. 9 through 12.

At 1715, the base station may transmit, to the UE, an indication of the monitoring window. The operations of 1715 may be performed according to the methods described herein. In some examples, aspects of the operations of 1715 may be performed by a monitoring window manager as described with reference to FIGS. 9 through 12.

At 1720, the base station may transmit, to the UE, a control signal scheduling uplink resources for an uplink transmission by the UE on at least a first component carrier, the first component carrier in a first radio frequency spectrum band. The operations of 1720 may be performed according to the methods described herein. In some examples, aspects of the operations of 1720 may be performed by a control signal manager as described with reference to FIGS. 9 through 12.

At 1725, the base station may receive, based on the monitoring window, the uplink transmission on the first component carrier using the scheduled uplink resources. The operations of 1725 may be performed according to the methods described herein. In some examples, aspects of the operations of 1725 may be performed by an UL transmission manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving, from a network device, an indication of a duration of a monitoring window used by the network device to monitor for uplink transmissions from the UE, wherein the duration of the monitoring window is associated with a switching time of the UE;
    receiving a control signal scheduling uplink resources for an uplink transmission by the UE on at least a first component carrier, the first component carrier in a first radio frequency spectrum band;
    reconfiguring, in response to the received control signal, a first transmit chain of the UE from a second component carrier in a second radio frequency spectrum band to the first component carrier in the first radio frequency spectrum band for the uplink transmission; and
    transmitting, within the duration of the monitoring window and using at least the reconfigured first transmit chain, the uplink transmission on the first component carrier using the scheduled uplink resources.

2. The method of claim 1, further comprising:
    identifying a timing for the uplink transmission based at least in part on a timing offset indicated by the received control signal;
    determining, based at least in part on the identified timing, that the first transmit chain can be reconfigured before expiration of the indicated monitoring window; and
    reconfiguring the first transmit chain based on the determining.

3. The method of claim 1, further comprising:
    transmitting a UE capability message indicating a reconfiguration time for the first transmit chain, wherein the duration of the monitoring window is based at least in part on the UE capability message.

4. The method of claim 3, wherein the duration of the monitoring window is cell-specific and based at least in part on a largest switching gap reported by at least one UE to the network device.

5. The method of claim 3, wherein the duration of the monitoring window is UE-specific for the UE based at least in part the UE capability message.

6. The method of claim 1, further comprising:
transmitting, in the uplink transmission, an indication that the UE has reconfigured the first transmit chain of the UE.

7. The method of claim 6, wherein the indication comprises one or more bits via a resource determined using a resource allocation mechanism which is decided by a value in a beta-offset table.

8. The method of claim 7, wherein the value in the beta-offset table comprises one or more entries of a hybrid automatic repeat request (HARQ) table, or one or more entries of a channel state information (CSI) table, or a combination thereof.

9. The method of claim 7, wherein the beta-offset table is for the indication of monitoring windows used by the network device.

10. The method of claim 1, wherein the monitoring window spans one or more slots, with a first slot of the one or more slots comprising a slot in which the uplink transmission is scheduled.

11. The method of claim 1, wherein the uplink transmission comprises an uplink data signal transmission, or an uplink control signal transmission, or a reference signal transmission, a physical random access channel (PRACH), or a combination thereof.

12. The method of claim 1, wherein the control signal comprises a radio resource control (RRC) grant, or a downlink control information (DCI) grant, or a combination thereof.

13. The method of claim 1, wherein the indication of the duration of the monitoring window is received in a radio resource control (RRC) configuration signal, or RRC reconfiguration signal, or a system information signal, or a combination thereof.

14. A method for wireless communication at a network device, comprising:
determining, based at least in part on a capability of a user equipment (UE), a duration of a monitoring window to use to monitor for uplink transmissions from the UE, wherein the duration of the monitoring window is associated with a switching time of the UE in accordance with the capability of the UE;
transmitting, to the UE, an indication of the duration of the monitoring window;
transmitting, to the UE, a control signal scheduling uplink resources for an uplink transmission by the UE on at least a first component carrier, the first component carrier in a first radio frequency spectrum band; and
receiving, within the duration of the monitoring window, the uplink transmission on the first component carrier using the scheduled uplink resources.

15. The method of claim 14, further comprising:
receiving a UE capability message indicating a reconfiguration time for a first transmit chain of the UE, wherein the duration of the monitoring window is based at least in part on the UE capability message.

16. The method of claim 15, wherein the duration of the monitoring window is cell-specific and based at least in part on a largest switching gap reported by at least one UE to the network device.

17. The method of claim 15, wherein the duration of the monitoring window is UE-specific for the UE based at least in part the UE capability message.

18. The method of claim 14, further comprising:
receiving, in the uplink transmission, an indication that the UE reconfigured a first transmit chain of the UE.

19. The method of claim 18, wherein the indication comprises one or more bits via a resource determined using a resource allocation mechanism which is decided by a value in a beta-offset table.

20. The method of claim 19, wherein the value in the beta-offset table comprises one or more entries of a hybrid automatic repeat request (HARQ) table, or one or more entries of a channel state information (CSI) table, or a combination thereof.

21. The method of claim 19, wherein the beta-offset table is for the indication of monitoring windows used by the network device.

22. The method of claim 14, wherein the monitoring window spans one or more slots, with a first slot of the one or more slots comprising a slot in which the uplink transmission is scheduled.

23. The method of claim 14, wherein the uplink transmission comprises an uplink data signal transmission, or an uplink control signal transmission, or a reference signal transmission, or a physical random access channel (PRACH) transmission, or a combination thereof.

24. The method of claim 14, wherein the control signal comprises a radio resource control (RRC) grant, or a downlink control information (DCI) grant, or a combination thereof.

25. The method of claim 14, wherein the indication of the duration of the monitoring window is transmitted in a radio resource control (RRC) configuration signal, or a RRC reconfiguration signal, or a system information signal, or a combination thereof.

26. A user equipment (UE) for wireless communication, comprising:
a processor,
memory coupled with the processor; and
instructions stored in the memory and executable by the processor to cause the UE to:
receive, from a network device, an indication of a duration of a monitoring window used by the network device to monitor for uplink transmissions from the UE, wherein the duration of the monitoring window is associated with a switching time of the UE;
receive a control signal scheduling uplink resources for an uplink transmission by the UE on at least a first component carrier, the first component carrier in a first radio frequency spectrum band;
reconfigure, in response to the received control signal, a first transmit chain of the UE from a second component carrier in a second radio frequency spectrum band to the first component carrier in the first radio frequency spectrum band for the uplink transmission; and
transmit, within the duration of the monitoring window and using at least the reconfigured first transmit chain, the uplink transmission on the first component carrier using the scheduled uplink resources.

27. The UE of claim 26, wherein the instructions are further executable by the processor to cause the UE to:
identify a timing for the uplink transmission based at least in part on a timing offset indicated by the received control signal;

determine, based at least in part on the identified timing, that the first transmit chain can be reconfigured before expiration of the indicated monitoring window; and reconfigure the first transmit chain based on the determining.

28. The UE of claim 26, wherein the instructions are further executable by the processor to cause the UE to:

transmit a UE capability message indicating a reconfiguration time for the first transmit chain, wherein the duration of the monitoring window is based at least in part on the UE capability message.

29. The UE of claim 28, wherein the duration of the monitoring window is cell-specific and based at least in part on a largest switching gap reported by at least one UE to the network device.

30. The UE of claim 28, wherein the duration of the monitoring window is UE-specific for the UE based at least in part the UE capability message.

31. The UE of claim 26, wherein the instructions are further executable by the processor to cause the UE to:

transmit, in the uplink transmission, an indication that the UE has reconfigured the first transmit chain of the UE.

32. The UE of claim 26, wherein the monitoring window spans one or more slots, with a first slot of the one or more slots comprising a slot in which the uplink transmission is scheduled.

33. The UE of claim 26, wherein the uplink transmission comprises an uplink data signal transmission, or an uplink control signal transmission, or a reference signal transmission, a physical random access channel (PRACH), or a combination thereof.

34. A network device for wireless communication, comprising:

a processor, memory coupled with the processor; and instructions stored in the memory and executable by the processor to cause the network device to:

determine, based at least in part on a capability of a user equipment (UE), a duration of a monitoring window to use to monitor for uplink transmissions from the UE, wherein the duration of the monitoring is associated with a switching time of the UE in accordance with the capability of the UE;

transmit, to the UE, an indication of the monitoring window;

transmit, to the UE, a control signal scheduling uplink resources for an uplink transmission by the UE on at least a first component carrier, the first component carrier in a first radio frequency spectrum band; and receive, within the duration of the monitoring window, the uplink transmission on the first component carrier using the scheduled uplink resources.

35. An apparatus for wireless communication at a user equipment (UE), comprising:

means for receiving, from a network device, an indication of a duration of a monitoring window used by the network device to monitor for uplink transmissions from the UE, wherein the duration of the monitoring window is associated with a switching time of the UE;

means for receiving a control signal scheduling uplink resources for an uplink transmission by the UE on at least a first component carrier, the first component carrier in a first radio frequency spectrum band;

means for reconfiguring, in response to the received control signal, a first transmit chain of the UE from a second component carrier in a second radio frequency spectrum band to the first component carrier in the first radio frequency spectrum band for the uplink transmission; and means for transmitting, within the duration of the monitoring window and using at least the reconfigured first transmit chain, the uplink transmission on the first component carrier using the scheduled uplink resources.

* * * * *